(12) United States Patent
Wang et al.

(10) Patent No.: US 11,798,531 B2
(45) Date of Patent: Oct. 24, 2023

(54) SPEECH RECOGNITION METHOD AND APPARATUS, AND METHOD AND APPARATUS FOR TRAINING SPEECH RECOGNITION MODEL

(71) Applicant: TENCENT TECHNOLOGY (SHENZHEN) COMPANY LIMITED, Guangdong (CN)

(72) Inventors: Jun Wang, Shenzhen (CN); Dan Su, Shenzhen (CN); Dong Yu, Bothell, WA (US)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 508 days.

(21) Appl. No.: 17/077,141

(22) Filed: Oct. 22, 2020

(65) Prior Publication Data

US 2021/0043190 A1    Feb. 11, 2021

Related U.S. Application Data

(63) Continuation of application No. PCT/CN2019/111905, filed on Oct. 18, 2019.

(30) Foreign Application Priority Data

Oct. 25, 2018 (CN) .......................... 201811251081.7

(51) Int. Cl.
*G10L 15/02* (2006.01)
*G10L 15/06* (2013.01)

(52) U.S. Cl.
CPC ............ *G10L 15/02* (2013.01); *G10L 15/063* (2013.01)

(58) Field of Classification Search
CPC ....... G10L 15/02; G10L 15/063; G10L 15/16; G10L 15/20; G10L 21/0272; G06N 3/044; G06N 3/045
See application file for complete search history.

(56) References Cited

U.S. PATENT DOCUMENTS

| 9,280,982 B1 * | 3/2016 | Kushner ............. G10L 21/0232 |
| 2006/0111904 A1 * | 5/2006 | Wasserblat .............. G10L 17/00 704/E17.001 |

(Continued)

FOREIGN PATENT DOCUMENTS

| CN | 103152244 A | 6/2013 |
| CN | 103325381 A | 9/2013 |

(Continued)

OTHER PUBLICATIONS

International Search Report for PCT/CN2019/111905, dated Jan. 17, 2020.
Extended European Search Report dated Aug. 6, 2021 in Application No. 19874914.5.

(Continued)

*Primary Examiner* — Michael Colucci
(74) *Attorney, Agent, or Firm* — Sughrue Mion, PLLC

(57) ABSTRACT

A speech recognition method, a speech recognition apparatus, and a method and an apparatus for training a speech recognition model are provided. The speech recognition method includes: recognizing a target word speech from a hybrid speech, and obtaining, as an anchor extraction feature of a target speech, an anchor extraction feature of the target word speech based on the target word speech; obtaining a mask of the target speech according to the anchor extraction feature of the target speech; and recognizing the target speech according to the mask of the target speech.

20 Claims, 11 Drawing Sheets

(56) References Cited

U.S. PATENT DOCUMENTS

| | | | |
|---|---|---|---|
| 2017/0162194 A1 | 6/2017 | Nesta et al. | |
| 2018/0114522 A1* | 4/2018 | Hall | G10L 13/047 |
| 2019/0318725 A1* | 10/2019 | Le Roux | G10L 15/16 |
| 2020/0073882 A1* | 3/2020 | Guggilla | G06N 3/044 |

FOREIGN PATENT DOCUMENTS

| | | |
|---|---|---|
| CN | 106448680 A | 2/2017 |
| CN | 106782565 A | 5/2017 |
| CN | 106920544 A | 7/2017 |
| CN | 107195295 A | 9/2017 |
| CN | 107808660 A | 3/2018 |
| CN | 108615535 A | 10/2018 |
| CN | 110176226 A | 8/2019 |

OTHER PUBLICATIONS

Supplementary European Search Report dated Aug. 24, 2021 in Application No. 19874914.5.

Jun Wang et al., "Deep Extractor Network for Target Speaker Recovery From Single Channel Speech Mixtures", arxiv.org, Cornell University Library, Jul. 24, 2018, 5 pages total.

Quan Wang et al., "Voicefilter: Targeted Voice Separation by Speaker-Conditioned Spectrogram Masking", Retrieved from the Internet: URL:https://arvix.org/pdf/1810.04826v2.pdf, Oct. 12, 2018, 5 pages total.

Marc Delcroix et al., "Single Channel Target Speaker Extraction and Recognition with Speaker Beam", 2018 IEEE International Conference on Acoustics, Speech and Signal Processing (ICASSP), Apr. 15, 2018, pp. 5554-5558 (5 pages total).

* cited by examiner

SPEECH RECOGNITION METHOD AND APPARATUS, AND METHOD AND APPARATUS FOR TRAINING SPEECH RECOGNITION MODEL

CROSS-REFERENCE TO RELATED APPLICATION(S)

This application is a bypass continuation application of International Application No. PCT/CN2019/111905, filed on Oct. 18, 2019, which claims priority to Chinese Patent Application No. 201811251081.7, entitled "SPEECH RECOGNITION METHOD AND APPARATUS, AND METHOD AND APPARATUS FOR TRAINING SPEECH RECOGNITION MODEL", and filed with the National Intellectual Property Administration, PRC on Oct. 25, 2018, the disclosures of which are herein incorporated by reference in their entireties.

FIELD

The disclosure relates to the field of computer technologies, and in particular, to a speech recognition method and apparatus, and a method and an apparatus for training a speech recognition model.

BACKGROUND

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology of computer science, which attempts to understand essence of human intelligence and produces a new intelligent machine that responds in a manner similar to human intelligence. AI is to study design principles and implementation methods of various intelligent machines, so that the machines have the functions of perception, reasoning, and decision-making.

The AI technology is a comprehensive discipline, covering a wide range of fields including both hardware-level technologies and software-level technologies. The basic AI technology generally includes technologies such as sensors, dedicated AI chips, cloud computing, distributed storage, big data processing technologies, operating/interaction systems, and mechatronics. AI software technologies mainly include a computer vision technology, a speech processing technology, a natural language processing technology, machine learning/deep learning, and the like.

Key technologies of the speech technology include an automatic speech recognition (ASR) technology, a text-to-speech (TTS) technology, and a voiceprint recognition technology. To make a computer capable to listen, see, speak, and feel (or express emotions) is the future development direction of human-computer interaction, and speech is one of the most promising human-computer interaction methods in the future.

In intelligent speech interaction scenarios, especially in remote speaking situations, speech aliasing of different speakers commonly occurs. Currently, more attention is paid to the research of speech extraction of a target speaker in a hybrid speech.

In the related art, a speech recognition method mainly includes: generating an attractor for a speech of each speaker in a hybrid speech by using a deep attractor network, and estimating, by calculating distances between an embedding vector and the attractors, a mask weight of a time-frequency window corresponding to each attractor belonging to a corresponding speaker, so as to distinguish speeches of the speakers according to the mask weights.

However, in the speech recognition method in the related art, the quantity of speakers in the hybrid speech needs to be learned or estimated in advance, so as to distinguish speeches of different speakers. However, a speech of a target speaker cannot be traced and extracted in the related art.

SUMMARY

One or more example embodiments of the disclosure provide a speech recognition method and apparatus, a method and an apparatus for training a speech recognition model, an electronic device, and a storage medium, that solve the problems in the related art that accuracy of speech recognition is relatively low and a speech of a target speaker cannot be traced and recognized.

Specific technical solutions provided in the embodiments of the disclosure are as follows.

According to an aspect of an example embodiment of the disclosure, provided is a speech recognition method, performed by an electronic device, the method including:

recognizing a target word speech from a hybrid speech, and obtaining, as an anchor extraction feature of a target speech, an anchor extraction feature of the target word speech based on the target word speech;

obtaining a mask of the target speech according to the anchor extraction feature of the target speech; and recognizing the target speech according to the mask of the target speech.

According to an aspect of an example embodiment of the disclosure, provided is a method for training a speech recognition model, performed by an electronic device, the speech recognition model including a target speech extraction module and a target word determining module, the method including:

obtaining a speech sample set, the speech sample set being any one or any combination of: a clean target word speech sample set, a positive and negative sample set of a noisy target word speech, and a noisy command speech sample set;

training the target speech extraction module by using the speech sample set as an input of the target speech extraction module and by using a recognized target speech as an output of the target speech extraction module, a target function of the target speech extraction module being to minimize a loss function between the recognized target speech and a clean target speech; and training the target word determining module by using, as an input of the target word determining module, a target speech outputted by the target speech extraction module, and by using, as an output of the target word determining module, a target word determining probability, a target function of the target word determining module being to minimize a cross entropy (CE) loss function of a target word determining result.

According to an aspect of an example embodiment of the disclosure, provided is a speech recognition apparatus, including:

at least one memory configured to store program code; and at least one processor configured to read the program code and operate as instructed by the program code, the program code including:

first obtaining code configured to cause at least one of the at least one processor to recognize a target word speech from a hybrid speech, and obtain, as an anchor extraction feature of a target speech, an anchor extraction feature of the target word speech based on the target word speech;

second obtaining code configured to cause at least one of the at least one processor to obtain a mask of the target speech according to the anchor extraction feature of the target speech; and recognition code configured to cause at least one of the at least one processor to recognize the target speech according to the mask of the target speech.

According to an aspect of an example embodiment of the disclosure, provided is an apparatus for training a speech recognition model, the speech recognition model including a target speech extraction module and a target word determining module, the apparatus including:

at least one memory configured to store program code; and at least one processor configured to read the program code and operate as instructed by the program code, the program code including:

obtaining code configured to cause at least one of the at least one processor to obtain a speech sample set, the speech sample set being any one or any combination: a clean target word speech sample set, a positive and negative sample set of a noisy target word speech, and a noisy command speech sample set;

training code configured to cause at least one of the at least one processor to train the target speech extraction module by using the speech sample set as an input of the target speech extraction module and by using a recognized target speech as an output of the target speech extraction module, a target function of the target speech extraction module being to minimize a loss function between the recognized target speech and a clean target speech; and train the target word determining module by using, as an input of the target word determining module, a target speech outputted by the target speech extraction module, and by using, as an output of the target word determining module, a target word determining probability, a target function of the target word determining module being to minimize a cross entropy (CE) loss function of a target word determining result.

According to an aspect of an example embodiment of the disclosure, provided is an electronic device, including:

at least one memory, configured to store computer-readable program instructions; and at least one processor, configured to call the computer-readable program instructions stored in the memory to perform any one of the foregoing speech recognition method or the method for training a speech recognition model according to the obtained computer-readable program instructions.

According to an aspect of an example embodiment of the disclosure, provided is a non-transitory computer-readable storage medium, storing computer-readable program instructions, the computer-readable program instructions being loaded by a processor to perform any one of the foregoing speech recognition method or the method for training a speech recognition model.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

Figure 1:
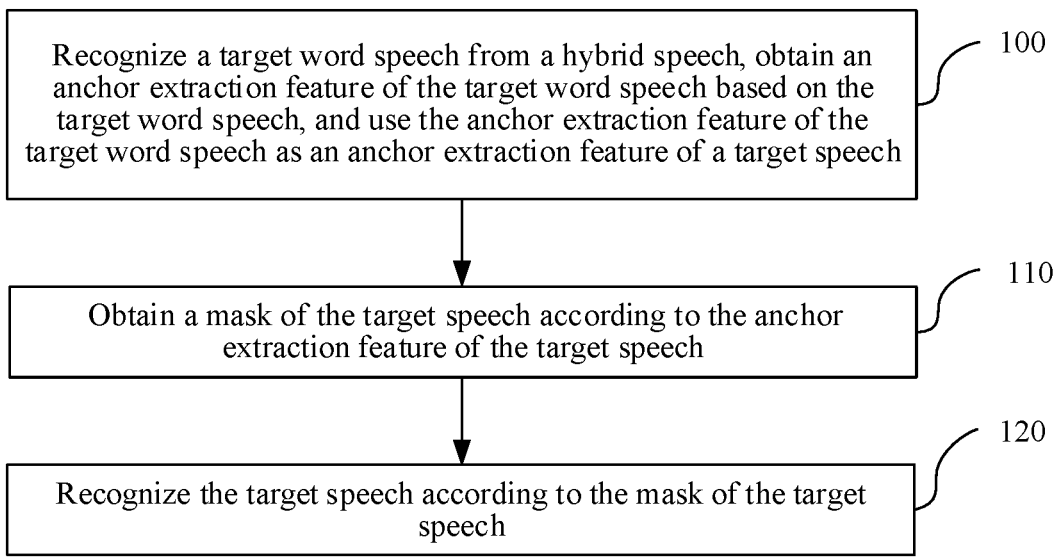
FIG. 1 is a flowchart of a speech recognition method according to an embodiment of the disclosure.

The following clearly and completely describes the technical solutions in the example embodiments of the disclosure with reference to the accompanying drawings. Apparently, the described embodiments are some of the embodiments of the disclosure rather than all of the possible embodiments of the disclosure. All other embodiments that may be obtained by a person of ordinary skill in the art based on the embodiments of the disclosure described herein without making creative efforts shall fall within the protection scope of the disclosure.

With the research and progress of artificial intelligence (AI) technologies, the AI technology has been researched and applied to many fields, such as a common smart home, a smart wearable device, a virtual assistant, a smart speaker, smart marketing, unmanned driving, automatic driving, an unmanned aerial vehicle, a robot, smart medical care, smart customer service, and speech recognition. It is believed that with the development of technology, the AI technology will be applied to more fields and play a more important and valuable role.

To facilitate the understanding of the embodiments of the disclosure, the following concepts are briefly introduced.

Wakeup-word: a word for waking up an AI device, so that the AI device is in a wakeup state.

Embedding vector: a fixed-length vector representation of a speech signal mapped into an embedding space of a specific dimension in an embodiment of the disclosure.

Normalized embedding vector: a vector representation after two embedding space mappings in an embodiment of the disclosure.

Anchor extraction feature: a speech feature representation of a speech signal.

Mask: a signal mask may be understood as a "bitmap", and each bit corresponds to a signal and may be used for masking a corresponding signal.

In addition, in the embodiments of the disclosure, a superscript "n (noisy)" represents a noisy speech; a superscript "c (clean)" represents a clean speech; a superscript "nw (noisy wakeup-word)" represents a noisy target word speech; a superscript "cw (clean wakeup-word)" represents a clean target word speech; a superscript "nc (noisy command)" represents a noisy command speech; and a superscript "cc (clean command)" represents a clean command speech. An input frequency spectrum $X_{f,t}$ is a short-time Fourier transform (STFT) in a logarithm domain, f represents a serial number of a frequency spectrum dimension, and t represents a frame serial number of a time dimension.

In the related art, for hybrid speech recognition, it is necessary to learn and estimate the quantity of speakers in the hybrid speech in advance, so as to distinguish speeches of different speakers. However, the related art technology cannot trace or recognize a speech of a specific target speaker, nor extract a speech of the specific target speaker in the hybrid speech.

Moreover, in the related art, training and learning is performed by using a single-layer embedding space for a calculated attractor of each speaker, and the obtained attractors are distributed relatively loosely and unstably, which reduces accuracy of speech recognition. In the related art, a later K-means clustering method may be used, to make obtained attractors distributed relatively concentrated. However, this method requires to use multi-frame speech signal clustering, and therefore cannot support frame-by-frame real-time processing, thus reducing accuracy of speech recognition.

Generally, in man-machine interaction scenarios, for example, man-machine interaction scenarios of a smart speaker and a smart television box, each interaction includes a target word followed by a command speech input from a target speaker. Therefore, the disclosure mainly aims to perform multi-task training in combination with the target word, and determine a target speech feature based on the target word. According to the embodiments of the disclosure, a person who speaks the target word is a target speaker, and a feature of the target word speech is a target speech feature. The target speech is determined and traced by recognizing the target word, and a noisy command speech received subsequently, that is, a target speech in a hybrid speech, is extracted, so that it is unnecessary to learn the quantity of speakers in the hybrid speech in advance. In this way, a specific target speech may be recognized and traced efficiently; moreover, in the embodiments of the disclosure, a double-layer embedding space is used for calculation and extraction, and the obtained target speech features, that is, anchor extraction features, are more concentrated and stable, so that accuracy of recognition and extraction of the target speech in the hybrid speech is higher.

The speech recognition method in the embodiments of the disclosure may be performed by a smart terminal; alternatively, after receiving a hybrid speech, the smart terminal may transmit the hybrid speech to a server, and the server performs speech recognition and transmit a speech recognition result to the smart terminal. The smart terminal and the server may be connected through the Internet, so as to communicate with each other. The server may be a backend server providing a corresponding network service. A specific device for performing the speech recognition method is not limited in the embodiments of the disclosure.

In addition, the embodiments of the disclosure mainly aim at training the target word speech and learning the target speech, for example, the target word speech is a wakeup-word speech. The training and the learning and recognition of the target speech may be performed based on other adaptive speeches or keywords, and this is not limited in the embodiments of the disclosure. The embodiments of the disclosure are mainly described and illustrated by using a wakeup-word as an example.

FIG. 1 is a flowchart of a speech recognition method according to an embodiment of the disclosure. The method includes the following operations:

Operation 100. Recognize a target word speech from a hybrid speech, obtain an anchor extraction feature of the target word speech based on the target word speech, and use the anchor extraction feature of the target word speech as an anchor extraction feature of a target speech.

When operation 100 is performed, operations a1 to a2 may be included.

Operation a1. Recognize a target word speech from a hybrid speech.

This operation may include: determining an embedding vector corresponding to each time-frequency window of the hybrid speech; and determining, according to the determined embedding vectors and a preset anchor extraction feature, target word annotation information corresponding to the embedding vectors.

Operation a2. Obtain an anchor extraction feature of the target word speech based on the target word speech, and use the anchor extraction feature of the target word speech as an anchor extraction feature of a target speech.

This operation may include: obtaining the anchor extraction feature of the target speech according to the embedding vectors, the preset anchor extraction feature, and the corresponding target word annotation information.

Operation 110. Obtain a mask of the target speech according to the anchor extraction feature of the target speech.

Operation 120. Recognize the target speech according to the mask of the target speech.

In this way, in this embodiment of the disclosure, a target word speech is recognized in a hybrid speech, a speech feature of the target word speech is learned, the speech feature of the target word speech is used as a speech feature of a target speech, that is, an anchor extraction feature of the target speech is obtained. Then, a mask of the target speech may be further calculated according to the anchor extraction feature of the target speech, and the target speech is recognized.

Figure 2:
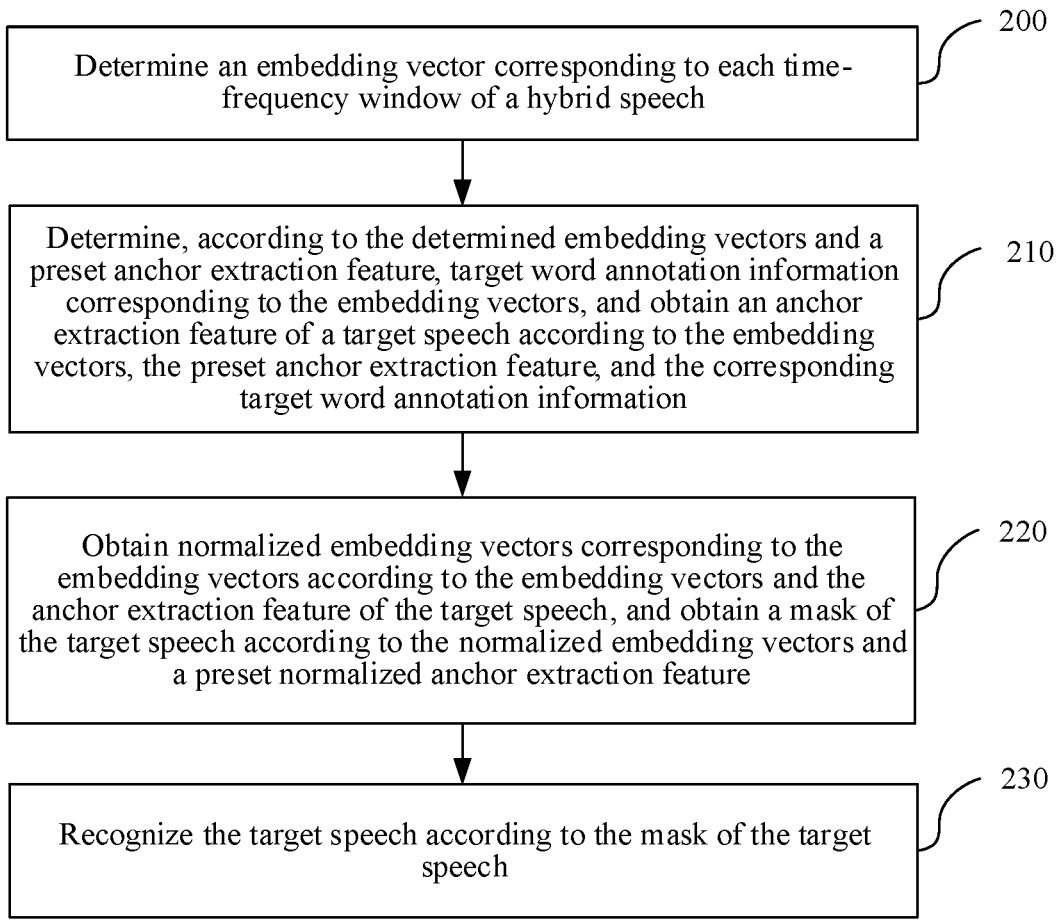
FIG. 2 is a flowchart of another speech recognition method according to an embodiment of the disclosure.

FIG. 2 is a flowchart of another speech recognition method according to an embodiment of the disclosure. The method includes the following operations:

Operation 200. Determine an embedding vector corresponding to each time-frequency window of a hybrid speech.

When operation 200 is performed, operations b1 to b2 may be included.

Operation b1. Perform an STFT on the hybrid speech, to obtain a frequency spectrum of the hybrid speech.

A main principle of the STFT is to add a signal to a sliding time window and perform a Fourier transform on the signal in the window, to obtain a time-varying frequency spectrum of the signal.

Operation b2. Map the frequency spectrum of the hybrid speech into an original embedding space of a fixed dimension based on a pre-trained deep neural network, to obtain the embedding vector corresponding to each time-frequency window of the hybrid speech.

For example, a frequency spectrum of the hybrid speech after the STFT is $X_{f,t}$, and is mapped to be an embedding vector $V_{f,t}$ in a K-dimensional embedding space through the deep neural network. For example, K=40, f represents a serial number of a frequency spectrum dimension, and t represents a frame serial number of a time dimension.

For example, the deep neural network is a long short-term memory (LSTM) network, and is not limited in this embodiment of the disclosure. For example, the deep neural network includes four bidirectional LSTM layers, and each LSTM layer includes 600 nodes. Specific parameters may be set and adjusted according to actual situations. It should be noted that a model type and a topology structure of the deep neural network are not specifically limited in this embodiment of the disclosure, and the deep neural network may be of other effective new model structures, for example, a model combining a convolutional neural network (CNN) and other network structures, or other network structures, such as a time delay network or a gated convolutional neural network. In this embodiment of the disclosure, the topology structure of the deep neural network may be extended or simplified according to the limitation on model memory occupancy and a requirement on detection accuracy in an actual application or implementation.

In this embodiment of the disclosure, the embedding vector is a fixed-length vector representation of a speech signal mapped into a space of a specific dimension, and the embedding vector is $V_{f,t} \in R^k$.

Operation 210. Determine, according to the determined embedding vectors and the preset anchor extraction feature, target word annotation information corresponding to the embedding vectors, and obtain an anchor extraction feature of the target speech according to the embedding vectors, the preset anchor extraction feature, and the corresponding target word annotation information.

When operation 210 is performed, operations c1 to c2 may be included.

Operation c1. Determine, according to the determined embedding vectors and a preset anchor extraction feature, target word annotation information corresponding to the embedding vectors.

This operation may include: separately combining the embedding vectors with the preset anchor extraction feature of the target speech; inputting combined vectors into a pre-trained first forward network; obtaining the target word annotation information corresponding to the embedding vectors outputted by the first forward network after recognizing the combined vectors, where a value of target word annotation information corresponding to an embedding vector not including the target word speech is 0, and a value of target word annotation information corresponding to an embedding vector including the target word speech is 1.

For example, each embedding vector is $V_{f,t}$, the preset anchor extraction feature is $\overline{A}^{cw}$, $V_{f,t}$ and $\overline{A}^{cw}$ are combined into a 2K-dimensional vector and inputted into the first forward network, and the corresponding target word annotation information is predicted and marked as $Y_{f,t}$, so as to obtain whether each embedding vector belongs to annotation information of the target speech.

In this way, the target word speech may be recognized from the hybrid speech by estimating the target word annotation information in the hybrid speech.

The preset anchor extraction feature is a mean of centers-of-mass of anchor extraction features corresponding to clean target word speech samples of users in a clean target word speech sample set obtained through pre-training, that is, an average anchor extraction feature of the clean target word speech sample set obtained through pre-training. Specific training of the preset anchor extraction feature is described in detail later.

In this way, when the speech recognition method in this embodiment of the disclosure is used, there is no need to re-estimate an anchor extraction feature or perform clustering. Therefore, frame-by-frame real-time processing of speech may be supported. Moreover, in this embodiment of the disclosure, the anchor extraction features obtained through training are more concentrated and stable. Therefore, an anchor extraction feature used in a speech recognition application is more accurate, so that calculation of an anchor extraction feature of a subsequent target speech is more accurate, thereby improving accuracy of target speech recognition and extraction.

Operation c2. Obtain the anchor extraction feature of the target speech according to the embedding vectors, the preset anchor extraction feature, and the corresponding target word annotation information.

This operation may include: obtaining the anchor extraction feature of the target word speech according to the embedding vectors, the preset anchor extraction feature, and the corresponding target word annotation information, and using the anchor extraction feature of the target word speech as the anchor extraction feature of the target speech. For ease of description, in this embodiment, obtaining an anchor extraction feature is described as obtaining an anchor extraction feature of a target speech directly. For ease of description and illustration, in the following related descriptions, the obtaining an anchor extraction feature is also described as obtaining an anchor extraction feature of a target speech directly.

In this embodiment of the disclosure, the anchor extraction feature of the target word speech is obtained through calculation according to the embedding vectors, the preset anchor extraction feature, and the corresponding target word annotation information. The speech feature of the target speech is consistent with the speech feature of the target word speech. Therefore, the target speech may be learned and traced through the target word speech in this embodiment of the disclosure. Therefore, in this embodiment of the disclosure, the anchor extraction feature of the target word speech may be used as the anchor extraction feature of the target speech.

For example, each embedding vector is $V_{f,t}$, the preset anchor extraction feature is $\overline{A}^{cw}$, the target word annotation information is $Y_{f,t}$, and the anchor extraction feature of the target speech is $A^{nw}$. Then $$A^{nw} = (1-\alpha)\overline{A}^{cw} + \alpha \frac{\sum_{f,t} V_{f,t} \times Y_{f,t}}{\sum_{f,t} Y_{f,t}}.$$

α is an adjustment parameter, a larger α indicates that the calculated anchor extraction feature is closer to an estimated anchor extraction feature of the target speech; on the contrary, a smaller α indicates that the anchor extraction feature is closer to the preset anchor extraction feature.

In this way, in this embodiment of the disclosure, the anchor extraction feature of the target speech may be updated by adjusting a value of α, so as to improve accuracy of the anchor extraction feature of the target speech.

Operation 220. Obtain normalized embedding vectors corresponding to the embedding vectors according to the embedding vectors and the anchor extraction feature of the target speech; and obtain a mask of the target speech according to the normalized embedding vectors and a preset normalized anchor extraction feature.

When operation 220 is performed, operations d1 to d2 may be included.

Operation d1. Obtain normalized embedding vectors corresponding to the embedding vectors according to the embedding vectors and the anchor extraction feature of the target speech.

This operation may include: (1) Separately combining the embedding vectors with the anchor extraction feature of the target speech, to obtain combined 2K-dimensional vectors, where the embedding vectors and the anchor extraction feature of the target speech are K-dimensional vectors respectively.

(2) Inputting the combined 2K-dimensional vectors into a pre-trained second forward network.

(3) Mapping the combined 2K-dimensional vectors into a normalized embedding space of a fixed dimension again based on the second forward network, to obtain corresponding K-dimensional vectors outputted by the second forward network, and using the outputted K-dimensional vectors as normalized embedding vectors of the corresponding embedding vectors, where the second forward network is used for mapping an original embedding space into the normalized embedding space.

For example, each embedding vector is $V_{f,t}$, and the anchor extraction feature of the target speech is $A^{nw}$. Then, the obtained each normalized embedding vector is:

$$\tilde{V}_{f,t} = f([A_k^{nw}, V_{f,t}])$$

f(•) represents a nonlinear mapping function learned through the deep neural network, and the function of the nonlinear mapping function is to map the original embedding space into a new normalized embedding space.

Parameters of the second forward network may be set according to an actual situation, for example, a forward network with two layers may be set, each layer includes 256 nodes, an input is a 2K-dimensional vector, and an output is a K-dimensional vector. Certainly, a topology structure of the forward network may be extended or simplified according to the limitation on model memory occupancy and a requirement on detection accuracy of the actual application. This is not limited in this embodiment of the disclosure.

In this embodiment of the disclosure, the normalized embedding vector represents a vector obtained after two embedding space mappings; the first mapping is based on a hybrid speech frequency spectrum, and the second mapping is based on the embedding vector after the first mapping and the calculated anchor extraction feature of the target speech.

In this way, in this embodiment of the disclosure, after two embedding space mappings, that is, based on a double-layer embedding space, the hybrid speech is finally mapped to the normalized embedding space, so as to calculate the mask of the target speech according to the normalized anchor extraction feature of the target speech in the normalized embedding space. The impact of interference may be reduced through normalization, so that the distribution of the normalized anchor extraction feature of the target speech is more concentrated and stable, thereby improving accuracy of the recognized target speech.

Operation d2. Obtain a mask of the target speech according to the normalized embedding vectors and a preset normalized anchor extraction feature.

The preset normalized anchor extraction feature is a mean of centers-of-mass of normalized anchor extraction features corresponding to noisy speech samples of users in a noisy speech sample set obtained through pre-training, that is, a mean of normalized anchor extraction features of target speeches of a positive and negative sample set of a noisy target word speech or a noisy command speech sample set. An example of training of the preset normalized anchor extraction feature is described later.

This operation may include: calculating distances between the normalized embedding vectors and the preset normalized anchor extraction feature respectively, and obtaining the mask of the target speech according to values of the distances.

Further, the values of the distances are mapped into a range of [0, 1], and the mask of the target speech is formed according to the values of the distances after the mapping.

For example, the preset normalized anchor extraction feature is $\tilde{A}$, and each normalized embedding vector is $\tilde{V}_{f,t}$. Then the mask of the target speech is $\tilde{M}_{f,t}$=Sigmoid($\tilde{A} \times \tilde{V}_{f,t}$).

Sigmoid is an S-type function used for mapping variables into [0, 1], that is, mapping the values of the distances in this embodiment of the disclosure into the range of [0, 1], to facilitate extraction of the target speech subsequently.

Operation 230. Recognize the target speech according to the mask of the target speech.

For example, a frequency spectrum of the hybrid speech is $X_{f,t}$, and the mask of the target speech is $\tilde{M}_{f,t}$; then the recognized target speech is $X_{f,t} \times \tilde{M}_{f,t}$.

The mask of the target speech is calculated according to an inner product of the normalized embedding vectors and the normalized anchor extraction feature of the target speech. Therefore, a larger value of the inner product indicates a smaller distance between the normalized embedding vector and the normalized anchor extraction feature of the target speech, and a greater probability that the time-frequency window belongs to the target speech. As a result, a calculated value of the mask corresponding to the time-frequency window is larger, and a calculated value of corresponding $X_{f,t} \times \tilde{M}_{f,t}$ is larger, which indicates that the time-frequency window is extracted more frequently, so that the calculated target speech is closer to a real speech of a target speaker.

In this embodiment of the disclosure, a target speech may be recognized from a hybrid speech inputted currently, or may be recognized from a hybrid command speech received subsequently after the device is in a wakeup state. The speech recognition method in this embodiment of the disclosure is applicable in both cases.

Further, in this embodiment of the disclosure, after the target speech is recognized, the anchor extraction feature of the target speech may be adjusted dynamically. For example, if the target word is a wakeup-word, after a wakeup-word speech is recognized and the device is waken up, a target speech in the hybrid speech when the device is in a wakeup state is recognized, so as to improve accuracy of target speech recognition in an entire wakeup state of the device. Specifically, this embodiment of the disclosure provides a possible implementation, a recognized target speech is inputted into a pre-trained target word determining module to determine whether the target speech includes a target word speech, then an anchor extraction feature of the target speech is adjusted according to a determining result, and the target speech is recognized according to the adjusted anchor extraction feature of the target speech.

The adjusting an anchor extraction feature of the target speech according to a determining result may include: adjusting a preset adjustment parameter in a case that the determining result is that the target speech includes the target word speech, to reduce a weight of a preset anchor extraction feature in the calculated anchor extraction feature of the target speech, or adjusting a preset adjustment parameter in a case that the determining result is that the target speech does not include the target word speech, to increase a weight of a preset anchor extraction feature in the calculated anchor extraction feature of the target speech.

Specifically, a value of $\alpha$ in the anchor extraction feature $$A^{nw} = (1-\alpha)\bar{A}^{cw} + \alpha \frac{\sum_{f,t} V_{f,t} \times Y_{f,t}}{\sum_{f,t} Y_{f,t}}$$

of the target speech may be adjusted. In calculating the anchor extraction feature of the target speech, if it is determined that the target speech includes the target word speech, it indicates that the estimated target speech is close to an actual target speech, and a value of $\alpha$ may be increased to reduce the weight of the preset anchor extraction feature, so that a weight of the anchor extraction feature of the estimated target speech is increased; if it is determined that the target speech does not include the target word speech, it indicates that the estimated target speech may not be accurate, and a value of $\alpha$ may be reduced to increase the weight of the preset anchor extraction feature, so that the weight of the anchor extraction feature of the estimated target speech is reduced.

The anchor extraction feature of the target speech is calculated based on the estimated target word annotation information. Therefore, the recognition of the target word speech is also obtained through estimation. The recognition of the target word speech, that is, the target word annotation information, may have errors. Therefore, accuracy of the anchor extraction feature of the target speech may be reduced. Therefore, in this embodiment of the disclosure, if the target word speech recognition is accurate, the recognized target speech includes the target word speech when the smart terminal is not in a wakeup state, and may also include a command speech, for example, in a scenario that a user says a target word and a command at the same time. Therefore, by performing target word determination on the recognized target speech, that is, determining whether the recognized target speech includes the target word speech, accuracy of target word recognition may be further improved. If it is determined that the target speech includes the target word speech, the previous target word annotation information may be determined as correct, and the anchor extraction feature of the target speech obtained according to the target word annotation information is also accurate. Therefore, the value of $\alpha$ may be increased, to reduce the weight of the preset anchor extraction feature, so that the weight of the anchor extraction feature of the estimated target speech is increased. Moreover, after it is determined that the target speech includes the target word speech and the smart terminal enters a wakeup state, the target speech may be recognized from a subsequent hybrid command speech based on the adjusted anchor extraction feature of the target speech, so that the extracted target speech is more accurate.

In this embodiment of the disclosure, the target word determination is performed on the reconstructed target speech and the value of $\alpha$ is adjusted according to the determining result, so that the anchor extraction feature of the target speech may be adjusted dynamically. In this way, the target speech in a hybrid speech received after the device enters the wakeup state may be recognized based on the adjusted anchor extraction feature of the target speech, so as to improve accuracy of target speech recognition.

In this embodiment of the disclosure, when the smart terminal is being waken up or after the smart terminal enters the wakeup state, the target speech may be recognized based on the adjusted anchor extraction feature of the target speech. When the smart terminal enters a dormant state again, the adjusted anchor extraction feature of the target speech is restored to an initial preset anchor extraction feature, then the anchor extraction feature of the target speech is recalculated, and the calculated anchor extraction feature of the target speech may be adjusted again.

The speech recognition method in this embodiment of the disclosure may be applied to a plurality of programs and product applications, for example, a smart speaker, a smart television box, an on-line voice interaction system, a smart voice assistant, an on-board smart voice device, and simultaneous interpretation. The speech recognition method in this embodiment of the disclosure may be applied to far field man-machine interaction scenarios, and may optimize and train anchor extraction features of a target word speech and a target speech, so as to determine the anchor extraction feature of the target speech according to the target word speech and recognize the target speech during application, without knowing or estimating the quantity of speakers in the hybrid speech in advance. Moreover, the speech recognition method in this embodiment of the disclosure may be applied to cases where a target word speech or other keyword speeches are very short, and may also trace the target speech and learn the speech feature thereof effectively, achieving a wider application range. In this embodiment of the disclosure, the impact of noise may be eliminated through normalization calculation, and the anchor extraction feature obtained after the normalization is more stable and concentrated. Therefore, in an actual application, the hybrid speech may be processed in real time frame by one frame based on the learned preset anchor extraction feature and preset normalized anchor extraction feature, so as to reconstruct the speech of the target speaker. According to this embodiment of the disclosure, a high-quality speech of the target speaker may be reconstructed, performance such as a signal-to-distortion ratio (SDR) and a perceptual evaluation of speech quality (PESQ) indicator of the reconstructed target speech is improved, thereby improving accuracy of wakeup and an automatic speech recognition system markedly.

Based on the foregoing embodiment, a training process of speech recognition in the embodiments of the disclosure is specifically described.

The training process is generally performed at the backend server. Training of modules may be complex and involve a large computing amount. Therefore, the training process may be implemented by the backend server, so as to apply the trained modules and results to each smart terminal, to implement speech recognition.

Figure 3:
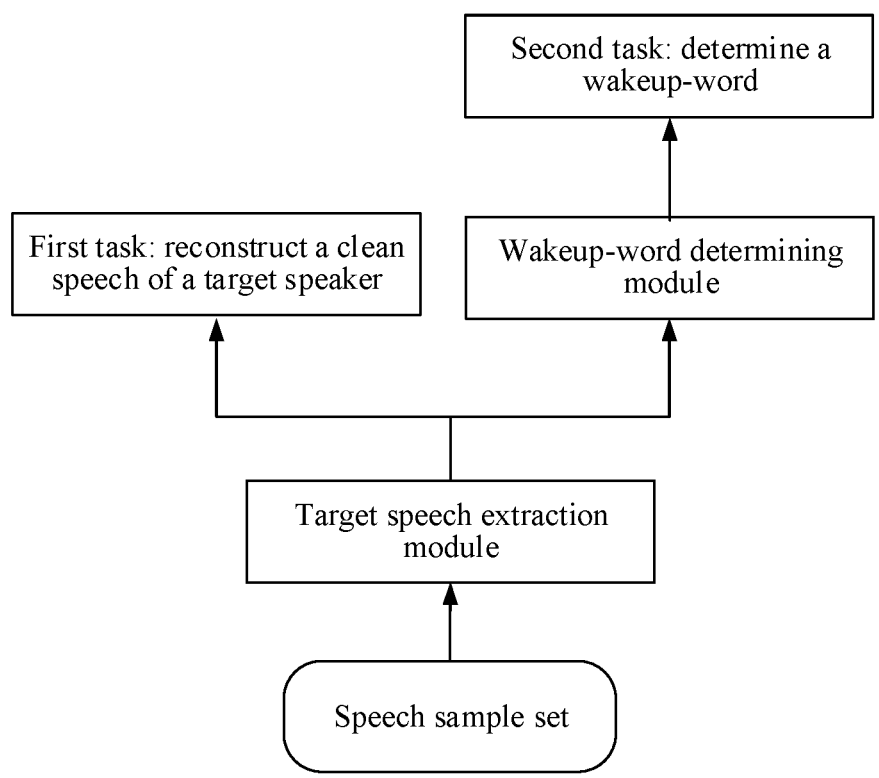
FIG. 3 is a framework diagram of a speech recognition system according to an embodiment of the disclosure.

FIG. 3 is a framework diagram of a speech recognition system according to an embodiment of the disclosure. In this embodiment of the disclosure, the speech recognition training mainly includes two tasks. The first task is to reconstruct a clean speech of a target speaker, that is, a target speech extraction module is configured to obtain, through training, an anchor extraction feature of a target speech based on a target word, and recognize the target speech from a hybrid speech. The second task is target word determination, that is, a target word determining module is configured to determine whether the reconstructed target speech includes a target word speech, so as to improve accuracy of target word annotation information. In this embodiment of the disclosure, a method for training a speech recognition model is provided, and the method may include the following operations.

Operation f1. Obtain a speech sample set. The speech sample set is any one or a combination of the following: a clean target word speech sample set, a positive sample set and a negative sample set of a noisy target word speech, and a noisy command speech sample set.

Operation f2. Train a target speech extraction module. An input of the target speech extraction module is the speech sample set, an output of the target speech extraction module is a recognized target speech, and a target function of the target speech extraction module is to minimize a loss function between the recognized target speech and a clean target speech.

Operation f3. Train a target word determining module. An input of the target word determining module is a target speech outputted by the target speech extraction module, an output of the target word determining module is a target word determining probability, and a target function of the target word determining module is to minimize a cross entropy (CE) loss function of a target word determining result.

In this embodiment of the disclosure, accuracy of recognizing the target word speech and accuracy of the anchor extraction feature of the target speech may be optimized at the same time mainly by training the target speech extraction module and the target word determining module, so as to improve, according to the target word speech feature, accuracy of recognizing the target speech corresponding to the target word speech feature. A performing sequence of operations f2 and f3 is not limited in this embodiment of the disclosure.

Based on FIG. 3 in the foregoing embodiment, it may be learned that the speech recognition training model in this embodiment of the disclosure mainly includes a target speech extraction module and a target word determining module, which are described respectively below.

First, the target speech extraction module is described in detail below.

Figure 4:
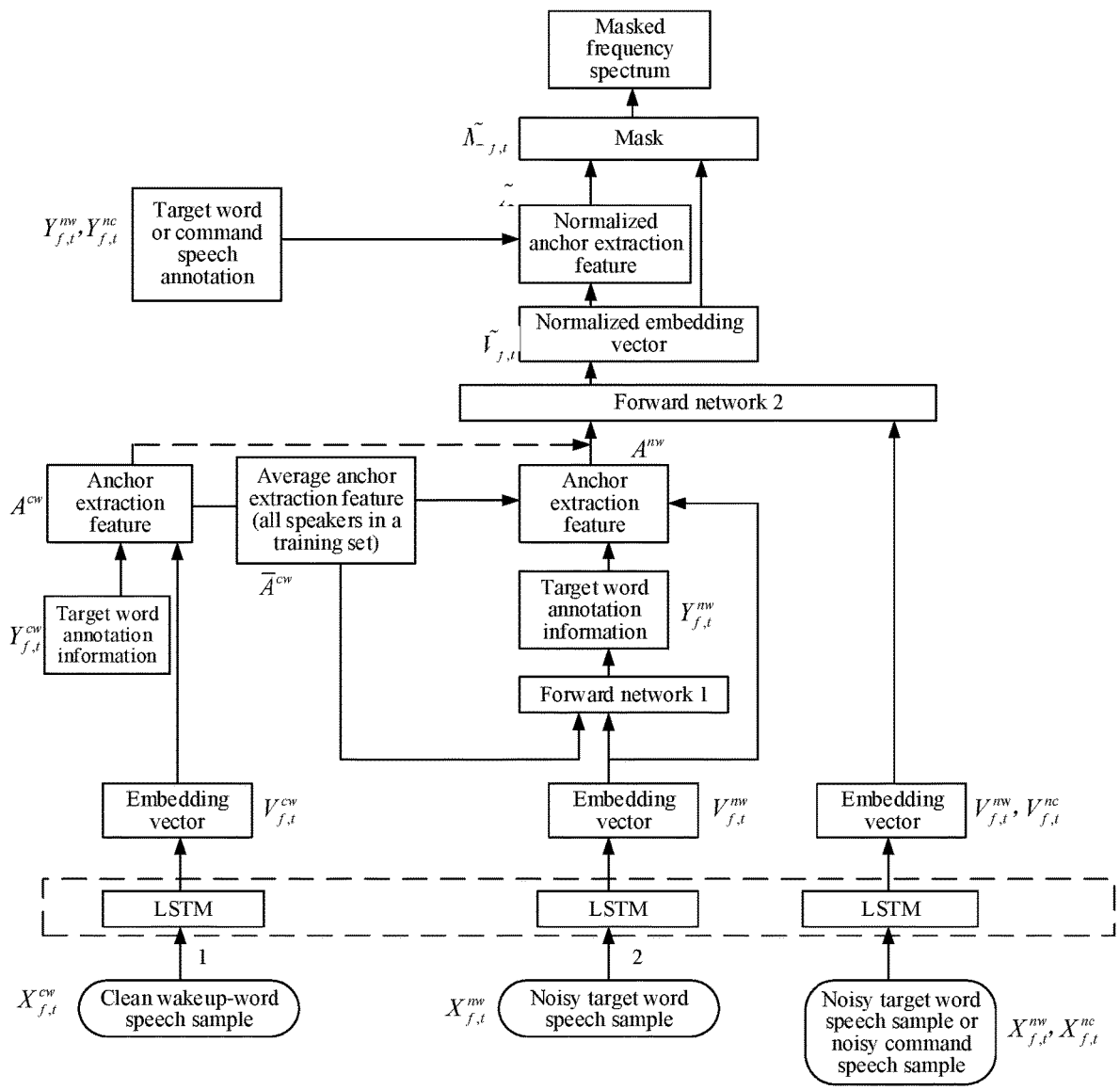
FIG. 4 is a structure framework diagram of an implementation solution of a target speech extraction module according to an embodiment of the disclosure.

FIG. 4 is a structure framework diagram of an implementation solution of a target speech extraction module according to an embodiment of the disclosure. A training process of the speech recognition in this embodiment of the disclosure is similar to an application process of actual speech recognition, and a training process of the target speech extraction module may be implemented by using different speech signal sample sets in turn. FIG. 4 includes several different signal sample sets, which are a clean target word speech sample set, a positive and negative sample set of a noisy target word speech, and a noisy command speech sample set respectively. This embodiment of the disclosure provides an overall implementation solution of the target speech extraction module, which may include the following (1) to (5) solutions.

Solution (1): The clean target word speech sample set includes at least a clean target word speech sample and corresponding target word annotation information; the positive and negative sample set of a noisy target word speech includes at least positive and negative samples of a noisy target word speech and corresponding target word annotation information; and the noisy command speech sample set includes at least a noisy command speech sample and corresponding target word annotation information.

The target word annotation information of the clean target word speech sample is determined in the following manner.

For the clean target word speech sample, a low-energy spectrum window noise is removed to obtain a more accurate annotation $Y_{f,t}^{cw}$. Specifically, an input frequency spectrum $X_{f,t}^{cw}$ of the clean target word speech sample is compared with a specific threshold $\Gamma$, if it is determined that a difference between a frequency spectrum amplitude of a time-frequency window and a maximum amplitude of the input frequency spectrum is less than the threshold, a value of the target word annotation information $Y_{f,t}^{cw}$ corresponding to the time-frequency window is 0; otherwise, the value of $Y_{f,t}^{cw}$ is 1, that is, $$Y_{f,t}^{cw} = \begin{cases} 1, & \text{if } X_{f,t}^{cw} > \max_{f,t}(X_{f,t}^{cw}) - \Gamma \\ 0, & \text{else} \end{cases}.$$

In this embodiment of the disclosure, a value of the threshold $\Gamma$ is 40 dB. Certainly, another value may be set according to actual situations and requirements.

The target word annotation information of the positive and negative samples of a noisy target word speech is determined as follows.

For the positive and negative samples of a noisy target word speech, the target word annotation is calculated by comparing the frequency spectrum amplitude thereof with a frequency spectrum amplitude of the clean target word speech of the target speaker. This embodiment of the disclosure provides a possible implementation: if it is determined that a proportion of the frequency spectrum amplitude of the clean target word speech of the target speaker in the noisy target word speech sample is greater than a preset proportion threshold, a value of the target word annotation $Y_{f,t}^{nw}$ of the noisy target word speech sample is determined to be 1; otherwise, the value of the target word annotation $Y_{f,t}^{nw}$ of the noisy target word speech sample is determined to be 0.

For example, if the preset proportion threshold is ½, and the frequency spectrum amplitude of the clean target word speech is greater than ½ of the frequency spectrum amplitude of the noisy target word speech sample, the annotation $Y_{f,t}^{nw}$ is "1", representing that a corresponding time-frequency signal belongs to the target speaker; otherwise, the annotation $Y_{f,t}^{nw}$ is "0", representing that a corresponding time-frequency signal belongs to a noisy signal, that is, $$Y_{f,t}^{nw} = \begin{cases} 1, & \text{if } X_{f,t}^{cw} > \frac{1}{2} X_{f,t}^{nw} \\ 0, & \text{else} \end{cases}.$$

Similarly, the target word annotation information $Y_{f,t}^{nc}$ of the noisy command speech sample in the training stage may be obtained through calculation.

Solution (2) First, for the clean wakeup-word speech sample in FIG. 4, for example, a frequency spectrum $X_{f,t}^{cw}$ of a clean target word speech sample corresponding to No. 1 in FIG. 4, is mapped as an embedding vector $V_{f,t}^{cw}$ of a K-dimensional embedding space through a deep neural network, where $V_{f,t}^{cw} \in R^k$.

For example, the deep neural network includes four bidirectional LSTM layers, and each LSTM layer includes 600 nodes, where K=40. Dashed boxes in the figures represent that the LSTM networks share the same parameter model, and the same parameters may be set.

The anchor extraction feature of the clean target word speech sample is calculated according to the embedding vector $V_{f,t}^{cw}$ of the clean target word speech sample and the corresponding target word annotation information $Y_{f,t}^{cw}$, specifically:

$$A^{nw} = \frac{\sum_{f,t} V_{f,t}^{cw} \times Y_{f,t}^{cw}}{\sum_{f,t} Y_{f,t}^{cw}}.$$

Next, anchor extraction features $A^{cw}$ of clean target word speech samples of all speakers in the clean target word speech sample set are averaged, to obtain an average anchor extraction feature $\overline{A}^{cw}$ of the clean target word speech sample set.

Solution (3) First, a frequency spectrum $X_{f,t}^{nw}$ of a noisy target word speech sample corresponding to No. 2 in FIG. 4 is mapped as an embedding vector $V_{f,t}^{nw} \in R^k$ of a K-dimensional embedding space through a deep neural network, for example, an SLTM network.

Next, the embedding vector $V_{f,t}^{nw} R^k$ of the noisy target word speech and the average anchor extraction feature $\overline{A}^{cw} \in R^k$ of the clean target word speech sample set are combined into a 2K-dimensional input vector, the target word annotation information $Y_{f,t}^{nw}$ thereof is predicted through a forward network 1, and the anchor extraction feature $A^{nw}$ of the target speaker, that is, the target speech, in the original embedding space is calculated according to the annotation $Y_{f,t}^{nw}$, the embedding vector $V_{f,t}^{nw} \in R^k$, and the average anchor extraction feature $\overline{A}^{cw}$ specifically:

$$A^{nw} = (1-\alpha)\overline{A}^{cw} + \alpha \frac{\sum_{f,t} V_{f,t}^{nw} \times Y_{f,t}^{nw}}{\sum_{f,t} Y_{f,t}^{nw}}.$$

α is an adjustment parameter, which may be dynamically adjusted through training, so as to dynamically adjust the anchor extraction feature of the target speech, to improve the accuracy.

Solution (4) First, for the frequency spectrum $X_{f,t}^{cw}$ of the noisy target word speech sample or the frequency spectrum $X_{f,t}^{nc}$ of the noisy command speech sample in FIG. 4, using $X_{f,t}^{nc}$ as an example for description, $X_{f,t}^{nc}$ is mapped as an embedding vector $V_{f,t}^{nc} \in R^k$ of a K-dimensional embedding space through the deep neural network LSTM.

Next, subsequent training is performed on $V_{f,t}^{nc}$ and the anchor extraction feature $A^{cw}$ of the clean target word speech sample or the anchor extraction feature $A^{nw}$ of the target speech in the noisy target word speech sample calculated in the foregoing (2) and (3).

In this embodiment of the disclosure, a clean target word speech signal flow 1 and a noisy target word speech signal flow 2 in FIG. 4 are trained alternately, to obtain anchor extraction features of target speeches of different training processes, so as to complete calculation of the anchor extraction feature of the target speech in the original embedding space, that is, a first layer of embedding space. The outputted anchor extraction features of the target speeches are then used in the normalized embedding space, that is, a second layer of embedding space, for calculating normalized anchor extraction features of the target speeches and calculating and extracting masks of the target speeches. Operations (1) to (3) may be included in this process.

Operation (1). Calculate a corresponding normalized embedding vector according to the embedding vector $V_{f,t}^{nc}$ of the noisy command speech sample and the anchor extraction feature of the target speech.

This operation may include: combining the embedding vector with the anchor extraction feature of the target speech, to obtain a combined 2K-dimensional vector, mapping the combined 2K-dimensional vector into a forward network 2, and mapping the combined 2K-dimensional vector into an embedding space of a fixed dimension again based on the forward network 2, to obtain a corresponding K-dimensional vector outputted by the forward network 2, and using the outputted K-dimensional vector as a normalized embedding vector of the corresponding embedding vector, that is, $$\tilde{V}_{f,t} = \begin{cases} f([A_k^{cw}, V_{f,t}^{nc}]), & \text{(during training of a signal flow 1)} \\ f([A_k^{nw}, V_{f,t}^{nc}]), & \text{(during training of a signal flow 2)} \end{cases}.$$

The forward network 2 is a forward network including two layers, each layer includes 256 nodes, an input is a 2K-dimensional vector, an output is a K-dimensional normalized embedding vector $\tilde{V}_{f,t}$, where $\tilde{V}_{f,t}$ is a normalized embedding vector. f(□) represents a nonlinear mapping function learned through the deep neural network, and is used for mapping the original embedding space into a new normalized embedding space.

Operation (2). Re-estimate the normalized anchor extraction feature of the target speech according to the normalized embedding vector $\tilde{V}_{f,t}$ and target speaker annotation information in the noisy command speech sample, that is, the target word annotation information $Y_{f,t}^{nc}$, specifically, $$\tilde{A} = \frac{\sum_{f,t} \tilde{V}_{f,t} \times Y_{f,t}^{nc}}{\sum_{f,t} Y_{f,t}^{nc}}.$$

$\tilde{A}$ is the normalized anchor extraction feature of the target speech.

Operation (3). Calculate a mask of the target speech according to the normalized anchor extraction feature $\tilde{A}$ of the target speech and the normalized embedding vector $\tilde{V}_{f,t}$, specifically, $$\tilde{M}_{f,t} = \text{Sigmoid}(\tilde{A} \times \tilde{V}_{f,t}).$$

$\tilde{M}_{f,t}$ is the mask of the target speech, $\tilde{A} \times \tilde{V}_{f,t}$ is an inner product of the normalized embedding vector and the normalized anchor extraction feature of the target speech, representing a distance between each normalized embedding vector and the normalized anchor extraction feature of the target speech, and Sigmoid is an S-type function used for mapping the calculated inner product value into [0, 1].

Finally, the target speech is recognized from the noisy target word speech sample or the noisy command speech sample according to the mask of the target speech, that is, a masked frequency spectrum of the obtained target speech is $X_{f,t} \times \tilde{M}_{f,t}$.

Solution (5) In this embodiment of the disclosure, solution (4) is to re-estimate the normalized anchor extraction feature of the target speech in the normalized embedding space and calculate the mask of the target speech, so that the distribution of the estimated anchor extraction features is more stable and concentrated. Moreover, in this embodiment of the disclosure, the mask of the target speech may alternatively be calculated in the original embedding space, and a specific target speech may be recognized to some extent. This operation may include: calculating the mask of the target speech according to the anchor extraction feature $A^{nw}$ of the target speech calculated in the foregoing solution (3) and the embedding vector $V_{f,t}$, that is, $$M_{f,t} = \text{Sigmoid}(A^{nw} \times V_{f,t}), \text{ where } M_{f,t} \text{ is the mask of the target speech.}$$

Then the obtained target speech is $X_{f,t} \times M_{f,t}$.

Hereinafter, the target word determining module is described in detail.

Figure 5:
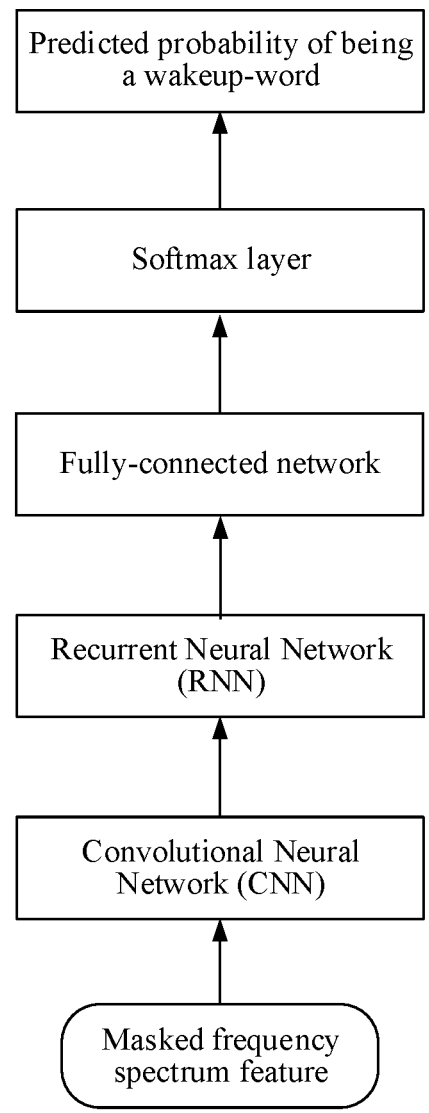
FIG. 5 is a structure framework diagram of an implementation solution of a target word determining module according to an embodiment of the disclosure.

FIG. 5 is a structure framework diagram of an implementation solution of a target word determining module according to an embodiment of the disclosure. In this embodiment of the disclosure, the target word determining module is configured to determine a probability of whether the reconstructed target speech includes the target word. An input of the module is a masked frequency spectrum feature $X_{f,t}^{nc} \times \tilde{M}_{f,t}$ outputted by the target speech extraction module, and an output is a determined probability of the reconstructed target speech including the target word.

Specifically, a length T and a window shift T' of an observation window of the target word are set according to a length of the target word; and a frequency spectrum of the inputted $X_{f,t}^{nc} \times \tilde{M}_{f,t}$ in each observation window is determined respectively.

T relates to the length of the target word (or expected duration of utterance of the target word), for example, T is 1.5 s, and T' is 100 ms. In this embodiment of the disclosure, a shorter T may be set during training, to implement a frame-by-frame determination on the frequency spectrum of the target speech. In this way, a feature of the target speech may be effectively traced and learned through a shorter target word speech, so that the target speech in the noisy speech may be recognized. Therefore, this embodiment of the disclosure is more applicable to a shorter target word in an actual application scenario.

As shown in FIG. 5, an input feature of each observation window may pass through a convolutional neural network (CNN), a recurrent neural network (RNN), a fully-connected network, and a softmax layer in order, and a final output is a predicted probability of including the target word. A specific network parameter may be weighed and adjusted according to a limitation on the calculation and memory resources in an actual application scenario. This embodiment of the disclosure may include possible examples, including (1) to (4) as follows:

(1). One CNN, where a value the quantity of filter channels ranges from 32 to 256, a value of the convolution kernel size in a time dimension ranges from 5 to 40, a value of the convolution kernel size in a frequency spectrum dimension ranges from 1 to 20, a value of a convolution operation in the time dimension ranges from 4 to 20, and a value of the convolution operation in the frequency spectrum dimension ranges from 1 to 10.

(2). One RNN, where a hidden unit of the RNN may be an LSTM unit or a gated recurrent unit (GRU), and the quantity of the hidden units ranges from 8 to 128.

(3). One fully-connected network, where the quantity of nodes ranges from 32 to 128.

(4). One softmax layer, where an output thereof is a predicted probability of the target word being included.

The target word determining module in this embodiment of the disclosure does not need to use all of the foregoing networks, and may alternatively adopt one of the networks for training. Compared with the related art, the target word determining module provided in this embodiment of the disclosure has a better structure and performance, so that accuracy of prediction may be improved.

In this way, in this embodiment of the disclosure, target word speech recognition and target speech feature learning may be optimized at the same time by using the target speech extraction module and the target word determining module, and an anchor extraction feature of a target speech corresponding to the target word may be learned effectively. Therefore, in an actual test and use, the learned anchor extraction feature of the target speech may be used as a preset anchor extraction feature, and there is no need to re-estimate the anchor extraction feature, so that an obtained speech signal may be processed frame by frame in real time, and a high-quality target speech is reconstructed.

Based on FIG. 3, FIG. 4, and FIG. 5 in the foregoing embodiments, training may be performed in turn according to different training sample sets in this embodiment of the disclosure. Therefore, the training process may be specifically divided into several different training stages. The first training stage is training based on a clean target word speech; the second training stage is training based on a noisy target word speech in an original embedding space; and the third training stage is training in a normalized embedding space based on a noisy target word speech. The following gives detailed descriptions respectively.

Figure 6:
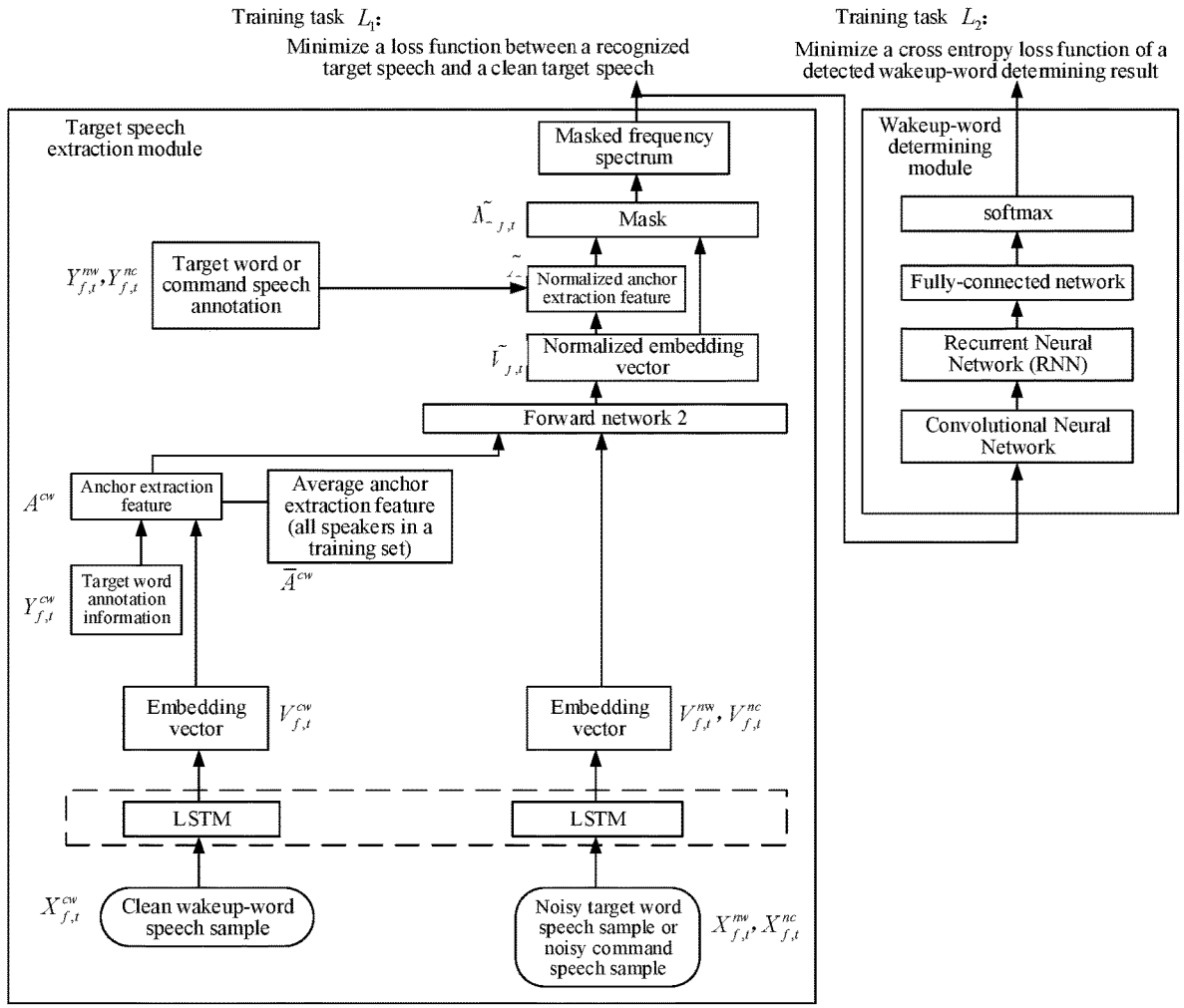
FIG. 6 is a structure framework diagram of a training solution based on a clean target word speech according to an embodiment of the disclosure.

In the first training stage, FIG. 6 is a framework diagram of a training solution based on a clean target word speech according to an embodiment of the disclosure, and a specific calculation method of each parameter is the same as that in the embodiment corresponding to FIG. 4.

An input is a clean target word speech sample, and positive and negative samples of a noisy target word speech or a noisy command speech sample; a training target is to optimize a target speech reconstruction task and a target word determination task at the same time. Therefore, a training target function includes: minimizing a loss function $L_1$ between the recognized target speech and a clean target speech and minimizing a CE loss function $L_2$ of a detected target word determining result, so as to reduce an error rate of the target word determination.

The loss function $L_1$ is an error between a frequency spectrum of the reconstructed target speech and a frequency spectrum of the clean target speech.

$$L_1 = \sum_{f,t} \left\| X_{f,t}^{cw} - X_{f,t}^{nw} \times \tilde{M}_{f,t} \right\|_2^2$$

The CE loss function of the target word determining result is $L_2$, where a target word determining result, that is, an annotation of "target word or not", required during calculation of the CE loss function may be obtained through a frame-level alignment of an ASR system of a Gaussian Mixed Model (GMM)/Hidden Markov Model (HMM) on a clean target wakeup speech.

The method for obtaining the target speech through training has been described in the embodiment corresponding to FIG. 4, and the following is a brief description thereof.

First, a clean target word speech sample, and positive and negative samples of a noisy target word speech or a noisy command speech sample are obtained.

Next, an embedding vector $V_{f,t}^{nc}$ corresponding to each time-frequency window of the clean target word speech sample, and an embedding vector $V_{f,t}^{nw}$ corresponding to each time-frequency window of the positive and negative samples of the noisy target word speech, or an embedding vector $V_{f,t}^{nc}$ corresponding to each time-frequency window of the noisy command speech sample are obtained respectively.

Next, an anchor extraction feature $A^{cw}$ of the clean target word speech sample is obtained according to target word annotation information $Y_{f,t}^{cw}$ of the clean target word speech sample and each embedding vector $V_{f,t}^{cw}$.

Further, in this embodiment of the disclosure, anchor extraction features $A^{cw}$ of clean target word speech samples of all speakers in the clean target word speech sample set may further be averaged, to obtain an average anchor extraction feature $\overline{A}^{cw}$ of the clean target word speech sample set.

Next, a normalized embedding vector corresponding to the noisy target word speech sample, or a normalized embedding vector $\tilde{V}_{f,t}$ corresponding to the noisy command speech sample is obtained according to an anchor extraction feature $A^{cw}$ of the clean target word speech sample and an embedding vector $V_{f,t}^{nw}$ of the noisy target word speech sample, or according to an anchor extraction feature $A^{cw}$ of the clean target word speech sample and an embedding vector $V_{f,t}^{nc}$ of the noisy command speech sample.

Next, a normalized anchor extraction feature $\tilde{A}$ of the target speech is obtained according to annotation information $Y_{f,t}^{nw}$ of the noisy target word speech sample or annotation information $Y_{f,t}^{nc}$ of the noisy command speech sample, and the normalized embedding vector $\tilde{V}_{f,t}$.

Next, a mask $\tilde{M}_{f,t}$ of the target speech is obtained according to the normalized anchor extraction feature $\tilde{A}$ of the target speech and the normalized embedding vector $\tilde{V}_{f,t}$.

Next, the target speech is recognized from the noisy target word speech sample or the noisy command speech sample according to the mask of the target speech, that is, a masked frequency spectrum $X_{f,t} \times \tilde{M}_{f,t}$.

In this way, a result of the first training task is obtained, and the target function is to minimize the loss function between the recognized target speech and a clean target speech.

Finally, the recognized target speech is inputted into the target word determining module to determine whether there is a target word, and the target function is to minimize a CE loss function of the target word determining result.

Figure 7:
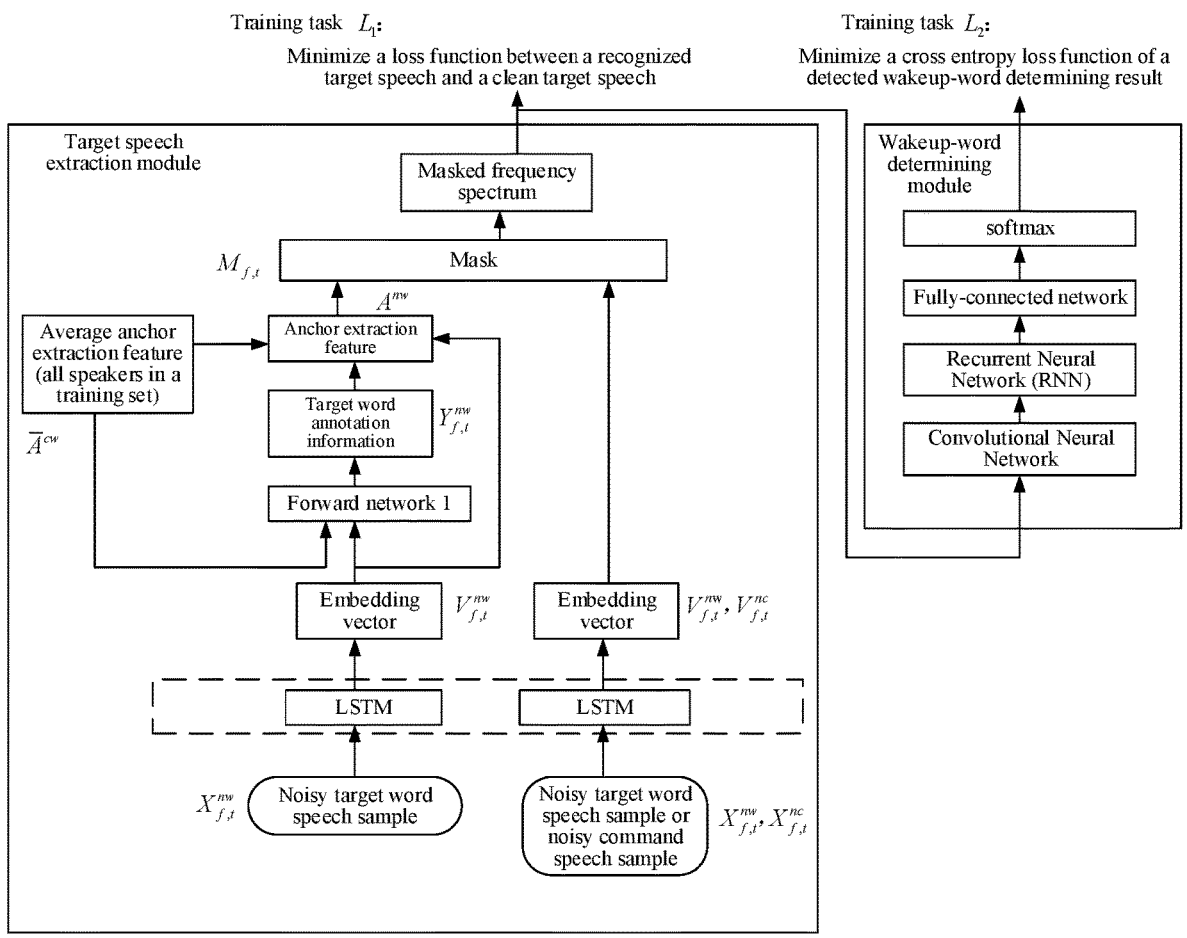
FIG. 7 is a structure framework diagram of a training solution based on a noisy target word speech in an original embedding space according to an embodiment of the disclosure.

In the second training stage, FIG. 7 is a framework diagram of a training solution based on a noisy target word speech in an original embedding space according to an embodiment of the disclosure, and a specific calculation method of each parameter is the same as that in the embodiment corresponding to FIG. 4.

An input is positive and negative samples of a noisy target word speech and/or a noisy command speech sample; a training target is basically the same as that in the first stage, that is, minimizing a loss function $L_1$ between the recognized target speech and a clean target speech and minimizing a CE loss function $L_2$ of a detected target word determining result.

The second stage is mainly used for optimizing related network parameters in the original embedding space. Therefore, the reconstructed target speech is obtained in the original embedding space, that is, an obtained target speech signal is $X_{f,t}^{nw} \times M_{f,t}$, that is, $$L_1 = \sum_{f,t} \|X_{f,t}^{cw} - X_{f,t}^{nw} \times M_{f,t}\|_2^2$$

of the second stage, and an input of the target word determining module for calculating $L_2$ is $X_{f,t}^{nw} \times M_{f,t}$.

The average anchor extraction feature in the second stage is calculated by averaging the anchor extraction features of the clean target word speech samples obtained in the first stage of all the speakers in the training sample set.

In an embodiment, first, the positive and negative samples of the noisy target word speech and/or the noisy command speech sample is obtained, and the embedding vector corresponding to each time-frequency window of the positive and negative samples of the noisy target word speech and the embedding vector corresponding to each time-frequency window of the noisy command speech sample are determined respectively.

Next, target word annotation information corresponding to each embedding vector of the noisy target word speech sample is determined according to the average anchor extraction feature of the clean target word speech sample set and the embedding vector of the noisy target word speech sample.

Next, the anchor extraction feature of the target speech is obtained according to each embedding vector of the noisy target word speech sample, the average anchor extraction feature, and the corresponding target word annotation information.

Next, the mask of the target speech is obtained according to the anchor extraction feature of the target speech and each embedding vector of the noisy target word speech sample, or according to the anchor extraction feature of the target speech and each embedding vector of the noisy command speech sample.

Next, the target speech is recognized from the noisy target word speech sample or the noisy command speech sample according to the mask of the target speech.

Finally, the recognized target speech is inputted into the target word determining module to determine whether there is a target word, and the target function is to minimize a CE loss function of the target word determining result.

Figure 8:
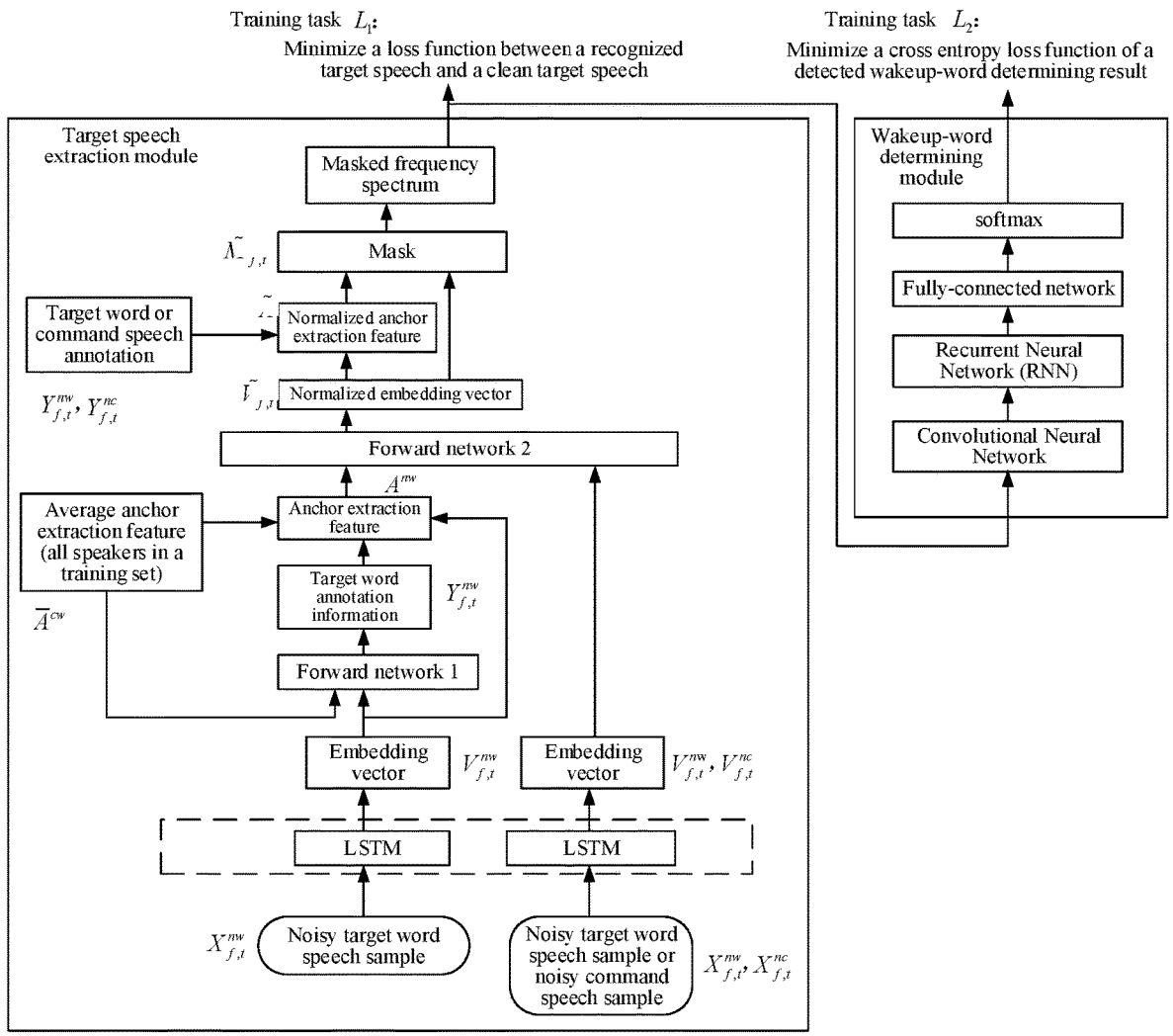
FIG. 8 is a structure framework diagram of a training solution based on a noisy target word speech in a normalized embedding space according to an embodiment of the disclosure.

In the third training stage, FIG. 8 is a framework diagram of a training solution based on a noisy target word speech in a normalized embedding space according to an embodiment of the disclosure, and a specific calculation method of each parameter is the same as that in the embodiment corresponding to FIG. 4.

An input of the third training stage is positive and negative samples of a noisy target word speech and/or a noisy command speech sample; a training target is the same as that in the first stage, that is, minimizing a loss function $L_1$ between the recognized target speech and a clean target speech and minimizing a CE loss function $L_2$ of a detected target word determining result.

The third training stage is mainly used for optimizing network parameters related to the normalized embedding space. The average anchor extraction feature in the third training stage is calculated by averaging the anchor extraction features of the clean target word speech samples obtained in the first stage of all the speakers in the training set.

In an embodiment, first, the positive and negative samples of the noisy target word speech and/or the noisy command speech sample is obtained, and the embedding vector corresponding to each time-frequency window of the positive and negative samples of the noisy target word speech and/or the embedding vector corresponding to each time-frequency window of the noisy command speech sample are determined respectively.

Next, target word annotation information corresponding to each embedding vector of the noisy target word speech sample is determined according to the average anchor extraction feature of the clean target word speech sample set and the embedding vector of the noisy target word speech sample.

Next, the anchor extraction feature of the target speech is obtained according to each embedding vector of the noisy target word speech sample, the average anchor extraction feature, and the corresponding target word annotation information.

Next, a normalized embedding vector corresponding to the noisy target word speech sample, or a normalized embedding vector corresponding to the noisy command speech sample is obtained according to an anchor extraction feature of the target speech and each embedding vector of the noisy target word speech sample, or according to an anchor extraction feature of the target speech and each embedding vector of the noisy command speech sample.

Next, a normalized anchor extraction feature of the target speech is obtained according to the corresponding target word annotation information and each normalized embedding vector, and a mask of the target speech is obtained according to each normalized embedding vector and the normalized anchor extraction feature of the target speech.

Next, the target speech is recognized from the noisy target word speech sample or the noisy command speech sample according to the mask of the target speech.

Finally, the recognized target speech is inputted into the target word determining module to determine whether there is a target word, and the target function is to minimize a CE loss function of the target word determining result.

The training of the foregoing three stages in this embodiment of the disclosure may be performed successively, alternately, or iteratively, and an implementation example of each training process may adopt an adaptive moment estimation (ADAM) optimization algorithm.

Figure 9:
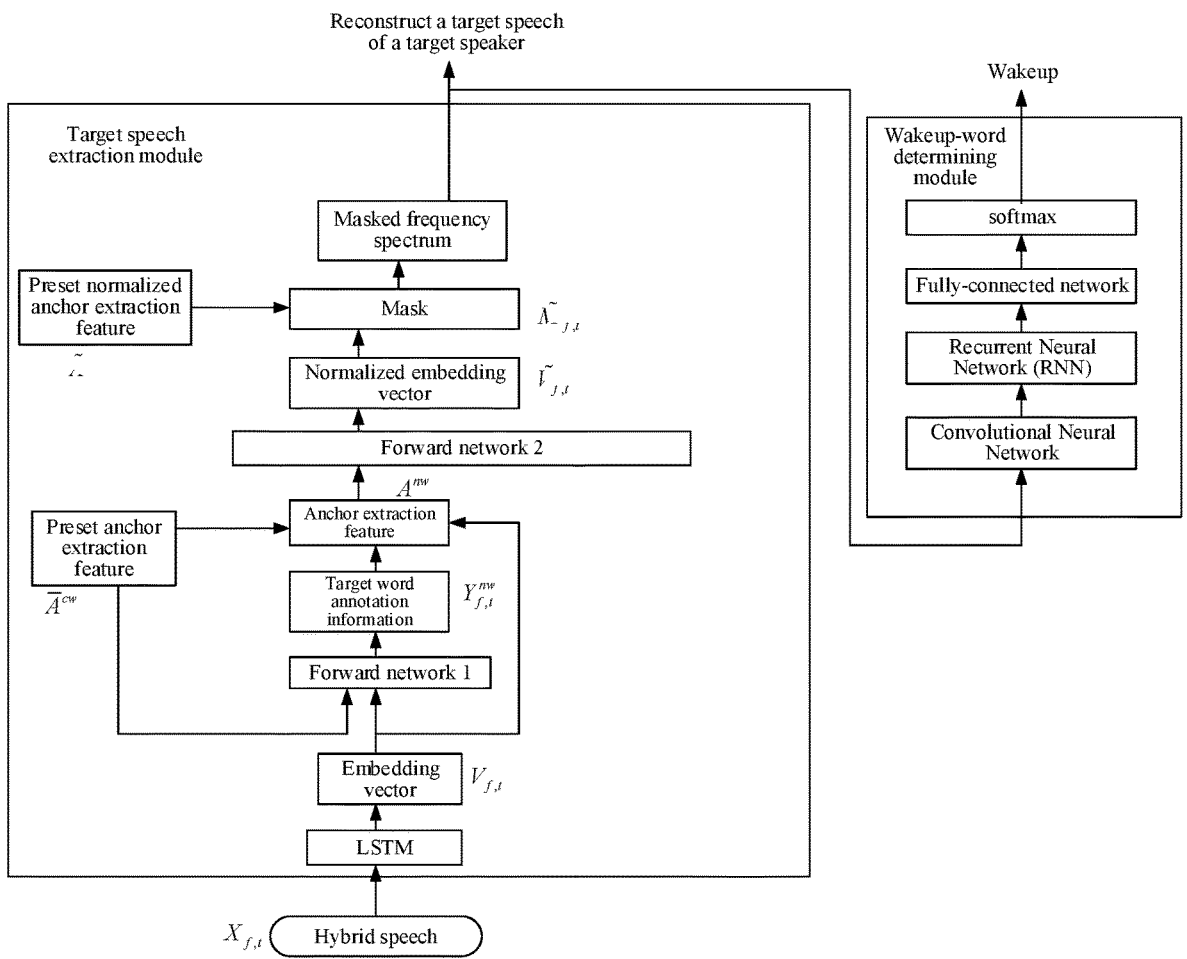
FIG. 9 is a structure framework diagram of a test solution of a speech recognition method according to an embodiment of the disclosure.

The following describes the speech recognition method in this embodiment of the disclosure by using a specific application scenario. After the training of the foregoing three stages is completed, a training result needs to be tested. For example, FIG. 9 is a framework diagram of a test solution of a speech recognition method according to an embodiment of the disclosure.

A test process is similar to an actual application process, that is, similar to the embodiment corresponding to FIG. 2. During the test, in the noisy speech, that is, in the inputted hybrid speech, the annotation of the target speech is unknowable, including $Y_{f,t}^{cw}$, $Y_{f,t}^{nw}$, or $Y_{f,t}^{nc}$. Therefore, in this embodiment of the disclosure, a center-of-mass of anchor extraction features corresponding to clean target word speech samples of all speakers in a training set is adopted as a preset anchor extraction feature during the test, that is, the average anchor extraction feature $\overline{A}^{cw}$ of the clean target word speech sample set obtained in the first training stage through training is used as the preset anchor extraction feature during the test. A center-of-mass of normalized anchor extraction features of noisy target word speech samples of all speakers in the training set is adopted as a preset normalized anchor extraction feature during the test, that is, an average of normalized anchor extraction features of target speeches in a positive and negative sample set of a noisy target word speech, or an average of normalized anchor extraction features of target speeches in a noisy command speech sample set obtained in the third training stage through training, is used as the preset normalized anchor extraction feature during the test.

In an embodiment, first, a hybrid speech $X_{f,t}$ is obtained, and an embedding vector $V_{f,t}$ corresponding to the hybrid speech in an original embedding space is obtained through LSTM.

Next, target word annotation information $Y_{f,t}^{nw}$ corresponding to the embedding vector is obtained through prediction according to a preset anchor extraction feature $\overline{A}^{cw}$ and the embedding vector $V_{f,t}$ through a forward network 1, and an anchor extraction feature $A^{nw}$ of the target speech is calculated according to $Y_{f,t}^{nw}$, $\overline{A}^{cw}$, and $V_{f,t}$.

Next, a normalized embedding vector $\tilde{V}_{f,t}$ corresponding to the embedding vector is calculated according to the embedding vector $V_{f,t}$, and the anchor extraction feature $A^{nw}$ of the target speech through a forward network 2.

Next, a mask $\tilde{M}_{f,t}$ of the target speech is calculated according to the normalized embedding vector $\tilde{V}_{f,t}$ and the preset normalized anchor extraction feature $\tilde{A}$.

Next, the target speech, that is, a masked frequency spectrum $X_{f,t} \times \tilde{M}_{f,t}$, is recognized from the inputted hybrid speech according to the mask $\tilde{M}_{f,t}$ of the target speech, that is, a target speech of a target speaker is reconstructed.

Finally, $X_{f,t} \times \tilde{M}_{f,t}$ is inputted into the target word determining module for a target word determination prediction; the target word is included, a device enters a state corresponding to the target word, for example, a wakeup state; if there is no target word, the device is still in a non-wakeup state, and the calculated anchor extraction feature $A^{nw}$ of the target speech is dynamically adjusted according to a determining result, so as to improve accuracy of the device in recognizing and tracing the target speech in the inputted hybrid speech in the wakeup state.

Figure 10:
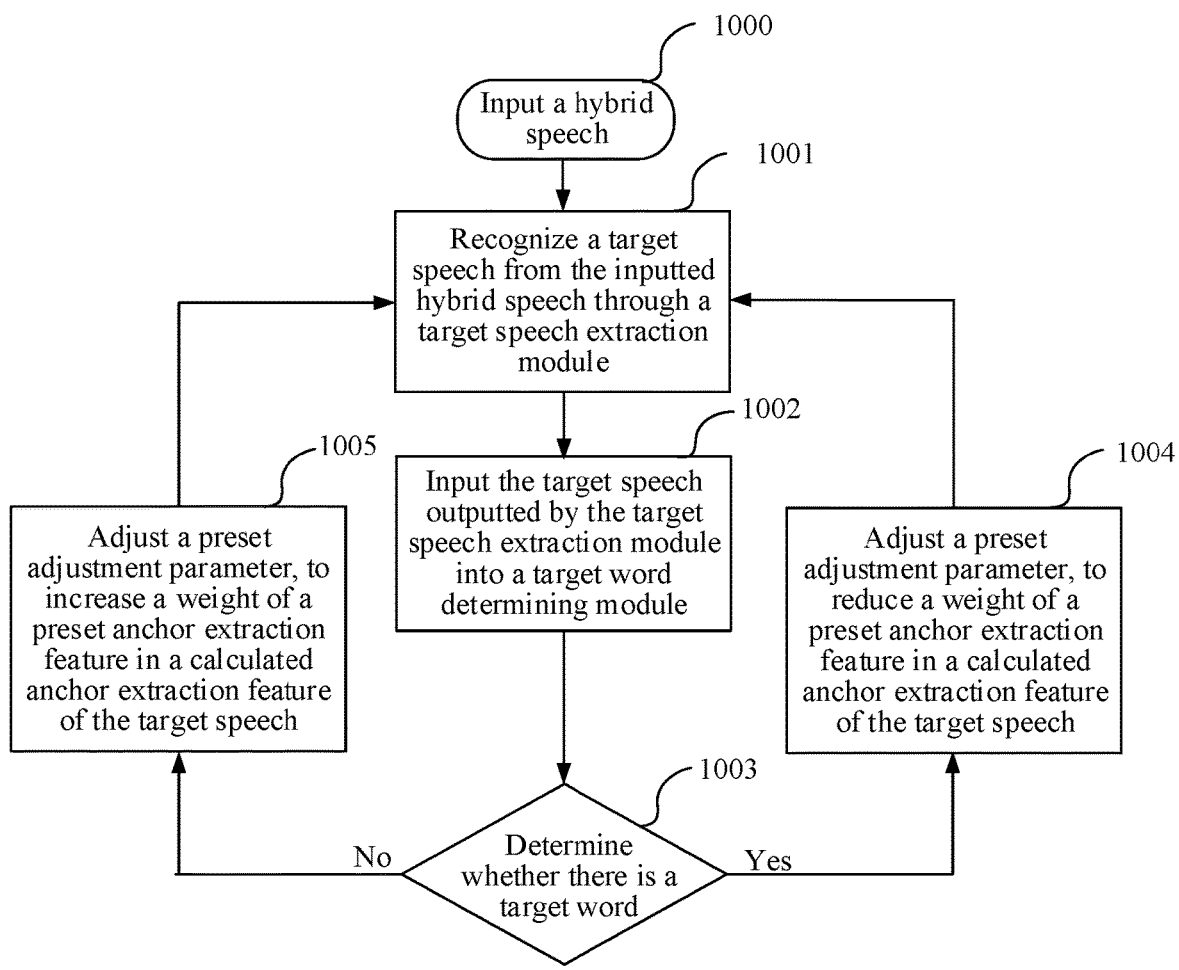
FIG. 10 is a schematic diagram of a test procedure of a speech recognition method according to an embodiment of the disclosure.

Specifically, FIG. 10 is a schematic diagram of a test procedure of a speech recognition method according to an embodiment of the disclosure. An example in which the target word is a wakeup-word is used for description, and the method includes the following operations:

Operation 1000. Input a hybrid speech.

Operation 1001. Recognize a target speech from the inputted hybrid speech through a target speech extraction module.

Operation 1002. Input the target speech outputted by the target speech extraction module into a target word determining module.

Operation 1003: Determine whether the target word is included, if yes, perform operation 1004; if not, perform operation 1005.

Operation 1004. Adjust a preset adjustment parameter, to reduce a weight of a preset anchor extraction feature in a calculated anchor extraction feature of the target speech.

In this case, if it is determined that the target word is included, it indicates that the device has entered a wakeup state, and subsequently, the target speech extraction module may trace a target speech corresponding to the target word speech, continuously adjust the anchor extraction feature of the target speech, and recognize a target command speech in a subsequent hybrid command speech according to the adjusted new anchor extraction feature of the target speech, so as to improve accuracy of target speech recognition.

Operation 1005. Adjust a preset adjustment parameter, to increase a weight of a preset anchor extraction feature in a calculated anchor extraction feature of the target speech.

In this case, if it is determined that there is no target word, the device may not be in a wakeup state, and the target word speech is not detected. The anchor extraction feature of the target speech may be more accurate than an initial preset anchor extraction feature. Therefore, in the subsequent calculation, the preset anchor extraction feature is used as much as possible for calculation.

In this case, in this embodiment of the disclosure, there is no need to re-estimate the anchor extraction feature or to adopt a k-means clustering algorithm in the related art. Therefore, frame-by-frame real-time processing for the inputted hybrid speech may be supported, and a target speech of a corresponding target speaker may be traced and recognized based on the target word.

Figure 11:
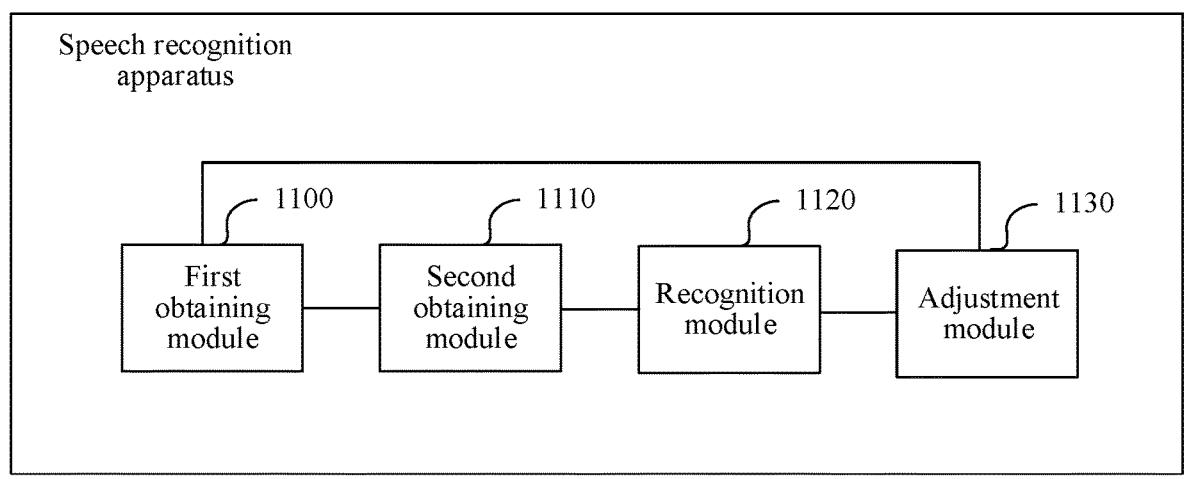
FIG. 11 is a schematic structural diagram of a speech recognition apparatus according to an embodiment of the disclosure.

Based on the foregoing embodiments, as shown in FIG. 11, a speech recognition apparatus in this embodiment of the disclosure may include:

a first obtaining module 1100, configured to recognize a target word speech from a hybrid speech, obtain an anchor extraction feature of the target word speech based on the target word speech, and use the anchor extraction feature of the target word speech as an anchor extraction feature of a target speech;

a second obtaining module 1110, configured to obtain a mask of the target speech according to the anchor extraction feature of the target speech; and a recognition module 1120, configured to recognize the target speech according to the mask of the target speech.

In this embodiment of the disclosure, the first obtaining module 1100 is configured to: determine an embedding vector corresponding to each time-frequency window of the hybrid speech; determine, according to the determined embedding vectors and a preset anchor extraction feature, target word annotation information corresponding to the embedding vectors; and obtain the anchor extraction feature of the target word speech according to the embedding vectors, the preset anchor extraction feature, and the corresponding target word annotation information, and use the anchor extraction feature of the target word speech as the anchor extraction feature of the target speech.

In this embodiment of the disclosure, the second obtaining module 1110 is configured to: obtain normalized embedding vectors corresponding to the embedding vectors according to the embedding vectors and the anchor extraction feature of the target speech; and obtain the mask of the target speech according to the normalized embedding vectors and a preset normalized anchor extraction feature.

In this embodiment of the disclosure, when determining the embedding vector corresponding to each time-frequency window of the hybrid speech, the first obtaining module 1100 is configured to:

perform an STFT on the hybrid speech, to obtain a frequency spectrum of the hybrid speech; and map the frequency spectrum of the hybrid speech into an original embedding space of a fixed dimension, to obtain the embedding vector corresponding to each time-frequency window of the hybrid speech.

In this embodiment of the disclosure, when determining the target word annotation information corresponding to the embedding vectors according to the determined embedding vectors and the preset anchor extraction feature, the first obtaining module 1100 is configured to:

separately combine the embedding vectors with the preset anchor extraction feature;

input combined vectors into a pre-trained first forward network; and obtain the target word annotation information corresponding to the embedding vectors outputted by the first forward network after recognizing the combined vectors, where a value of target word annotation information corresponding to an embedding vector not including the target word speech is 0, and a value of target word annotation information corresponding to an embedding vector comprising the target word speech is 1.

In this embodiment of the disclosure, when obtaining the normalized embedding vectors corresponding to the embedding vectors according to the embedding vectors and the anchor extraction feature of the target speech, the second obtaining module 1110 is configured to:

separately combine the embedding vectors with the anchor extraction feature of the target speech, to obtain combined 2K-dimensional vectors, where the embedding vectors and the anchor extraction feature of the target speech are K-dimensional vectors respectively;

input the combined 2K-dimensional vectors into a pre-trained second forward network; and map the combined 2K-dimensional vectors into a normalized embedding space of a fixed dimension again based on the second forward network, to obtain corresponding K-dimensional vectors outputted by the second forward network, and use the outputted K-dimensional vectors as normalized embedding vectors of the corresponding embedding vectors, where the second forward network is used for mapping an original embedding space into the normalized embedding space.

In this embodiment of the disclosure, when obtaining the mask of the target speech according to the normalized embedding vectors and a preset normalized anchor extraction feature, the second obtaining module 1110 is configured to: calculate distances between the normalized embedding vectors and the preset normalized anchor extraction feature respectively, and obtain the mask of the target speech according to values of the distances.

In this embodiment of the disclosure, the speech recognition apparatus further includes:

an adjustment module 1130, configured to input the recognized target speech into a pre-trained target word determining module; determine whether the target speech includes the target word speech; and adjust a preset adjustment parameter in response to determining that the target speech includes the target word speech, to reduce a weight of a preset anchor extraction feature in the calculated anchor extraction feature of the target speech, or adjust a preset adjustment parameter in response to determining that the target speech does not include the target word speech, to increase a weight of a preset anchor extraction feature in the calculated anchor extraction feature of the target speech; and recognize the target speech according to the adjusted anchor extraction feature of the target speech.

Figure 12:
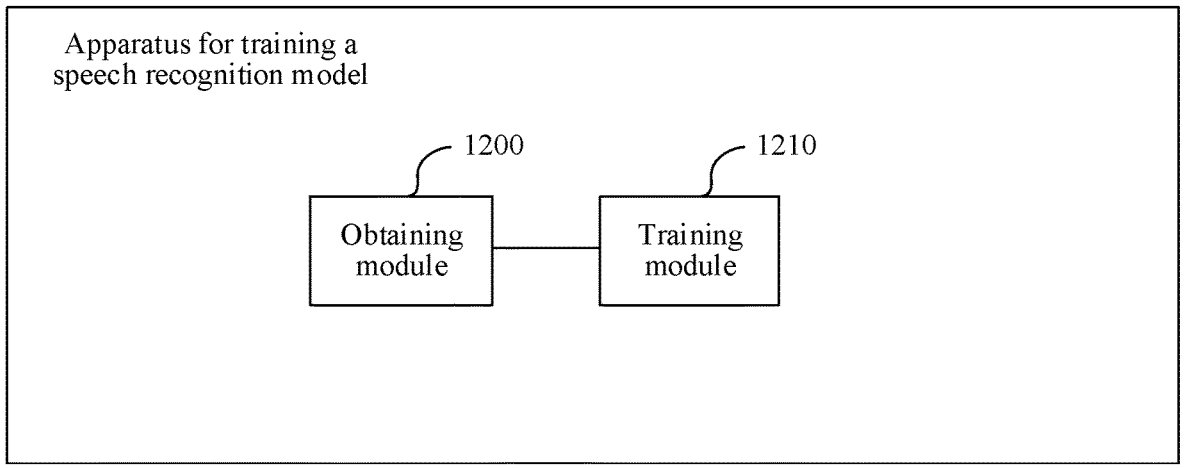
FIG. 12 is a schematic structural diagram of an apparatus for training a speech recognition model according to an embodiment of the disclosure.

Based on the foregoing embodiments, FIG. 12 is a schematic structural diagram of an apparatus for training a speech recognition model according to an embodiment of the disclosure. The speech recognition model includes a target speech extraction module and a target word determining module, and the training apparatus includes:

an obtaining module 1200, configured to obtain a speech sample set, the speech sample set being any one or a combination of the following: a clean target word speech sample set, a positive and negative sample set of a noisy target word speech, and a noisy command speech sample set;

a training module 1210, configured to train the target speech extraction module, an input of the target speech extraction module being the speech sample set, an output of the target speech extraction module being a recognized target speech, and a target function of the target speech extraction module being to minimize a loss function between the recognized target speech and a clean target speech; and train the target word determining module, an input of the target word determining module being a target speech outputted by the target speech extraction module, an output of the target word determining module being a target word determining probability, and a target function of the target word determining module being to minimize a CE loss function of a target word determining result.

In this embodiment of the disclosure, if the speech sample set is the clean target word speech sample set, and the positive and negative sample set of a noisy target word speech or the noisy command speech sample set, where clean target word speech sample set includes at least a clean target word speech and corresponding target word annotation information; the positive and negative sample set of a noisy target word speech includes at least a noisy target word speech and corresponding target word annotation information; and the noisy command speech sample set includes at least a noisy command speech and corresponding target word annotation information, when the target speech extraction module is trained, the training module 1210 is configured to:

obtain the clean target word speech sample, and the positive and negative samples of the noisy target word speech or the noisy command speech sample, and determine an embedding vector corresponding to each time-frequency window of the clean target word speech sample, an embedding vector corresponding to each time-frequency window of the positive and negative samples of the noisy target word speech, and an embedding vector corresponding to each time-frequency window of the noisy command speech sample respectively;

obtain the anchor extraction feature of the clean target word speech sample according to the target word annotation information and the embedding vectors of the clean target word speech sample, and obtain an average anchor extraction feature of the clean target word speech sample set according to the anchor extraction feature of each clean target word speech sample in the clean target word speech sample set;

obtain a normalized embedding vector corresponding to the noisy target word speech sample, or a normalized embedding vector corresponding to the noisy command speech sample according to the anchor extraction feature of the clean target word speech sample and the embedding vector of the noisy target word speech sample, or according to the anchor extraction feature of the clean target word speech sample and the embedding vector of the noisy command speech sample;

obtain a normalized anchor extraction feature of the target speech according to the corresponding target word annotation information and each normalized embedding vector, and obtain a mask of the target speech according to each normalized embedding vector and the normalized anchor extraction feature of the target speech; and recognize the target speech from the noisy target word speech sample or the noisy command speech sample according to the mask of the target speech.

In this embodiment of the disclosure, if the speech sample set is the positive and negative sample set of a noisy target word speech and/or the noisy command speech sample set, when the target speech extraction module is trained, the training module 1210 is configured to:

obtain positive and negative samples of the noisy target word speech and/or the noisy command speech sample, and determine an embedding vector corresponding to each time-frequency window of the positive and negative samples of the noisy target word speech and an embedding vector corresponding to each time-frequency window of the noisy command speech sample respectively;

determine target word annotation information corresponding to each embedding vector of the noisy target word speech sample according to the average anchor extraction feature of the clean target word speech sample set and the embedding vector of the noisy target word speech sample;

obtain an anchor extraction feature of the target speech according to each embedding vector of the noisy target word speech sample, the average anchor extraction feature, and the corresponding target word annotation information;

obtain a mask of the target speech according to the anchor extraction feature of the target speech and each embedding vector of the noisy target word speech sample, or according to the anchor extraction feature of the target speech and each embedding vector of the noisy command speech sample; and recognize the target speech from the noisy target word speech sample or the noisy command speech sample according to the mask of the target speech.

In this embodiment of the disclosure, if the speech sample set is the positive and negative sample set of a noisy target word speech or the noisy command speech sample set, when the target speech extraction module is trained, the training module 1210 is configured to:

obtain positive and negative samples of the noisy target word speech and/or the noisy command speech sample, and determine an embedding vector corresponding to each time-frequency window of the positive and negative sample of the noisy target word speech and an embedding vector corresponding to each time-frequency window of the noisy command speech sample respectively;

determine target word annotation information corresponding to each embedding vector of the noisy target word speech sample according to the average anchor extraction feature of the clean target word speech sample set and the embedding vector of the noisy target word speech sample;

obtain an anchor extraction feature of the target speech according to each embedding vector of the noisy target word speech sample, the average anchor extraction feature, and the corresponding target word annotation information;

obtain a normalized embedding vector corresponding to the noisy target word speech sample, or a normalized embedding vector corresponding to the noisy command speech sample according to the anchor extraction feature of the target speech and each embedding vector of the noisy target word speech sample, or according to the anchor extraction feature of the target speech and each embedding vector of the noisy command speech sample;

obtain a normalized anchor extraction feature of the target speech according to the corresponding target word annotation information and each normalized embedding vector, and obtain a mask of the target speech according to each normalized embedding vector and the normalized anchor extraction feature of the target speech; and recognize the target speech from the noisy target word speech sample or the noisy command speech sample according to the mask of the target speech.

In this embodiment of the disclosure, the preset anchor extraction feature is the average anchor extraction feature of the clean target word speech sample set obtained through pre-training; and the preset normalized anchor extraction feature is a mean of normalized anchor extraction features of target speeches of the positive and negative sample set of a noisy target word speech or the noisy command speech sample set obtained through pre-training.

Figure 13:
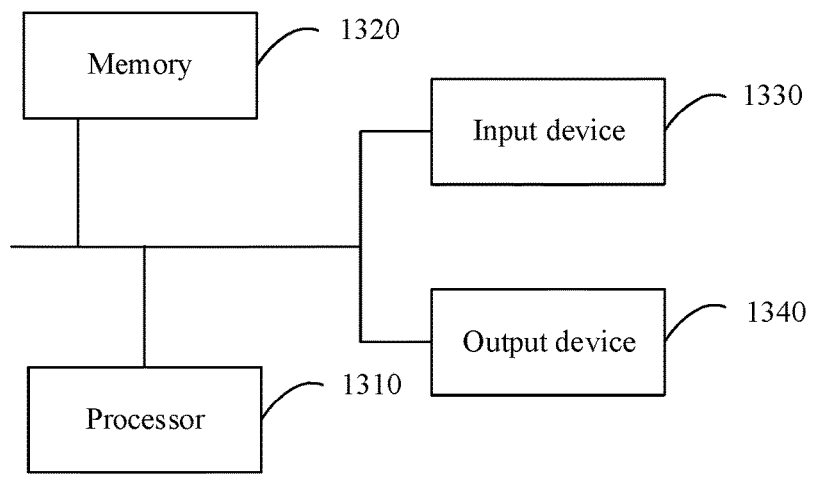
FIG. 13 is a schematic structural diagram of an electronic device according to an embodiment of the disclosure.

Based on the foregoing embodiments, FIG. 13 is a schematic structural diagram of an electronic device according to an embodiment of the disclosure.

This embodiment of the disclosure provides an electronic device. The electronic device may include a center processing unit (CPU) 1310, a memory 1320, an input device 1330, an output device 1340, and the like. The input device 1330 may include a keyboard, a mouse, a touchscreen, and the like. The output device 1340 may include a display device, such as a liquid crystal display (LCD) or a cathode ray tube (CRT). The electronic device may be a terminal (for example, a smart terminal), a server, or the like.

The memory 1320 may include a read-only memory (ROM) and a random access memory (RAM), and provide computer-readable program instructions and data stored in the memory 1320 for the processor 1310. In this embodiment of the disclosure, the memory 1320 may be configured to store program instructions of a speech recognition method according to the embodiments of the disclosure.

The processor 1310 may call the computer-readable program instructions stored in the memory 1320 to perform any one of the speech recognition methods or any of the methods for training a speech recognition model in the embodiments of the disclosure according to the obtained program instructions.

To facilitate the description, a portable multi-function apparatus 1400 including a touchscreen is used as an example for illustrative description in this embodiment of the disclosure. A person skilled in the art may understand that the embodiments in the disclosure may also be applicable to other apparatuses, for example, a handheld device, an in-vehicle device, a wearable device, a computing device, and various user equipment (UE), mobile stations (MS), terminals, terminal equipment, and the like.

Figure 14:
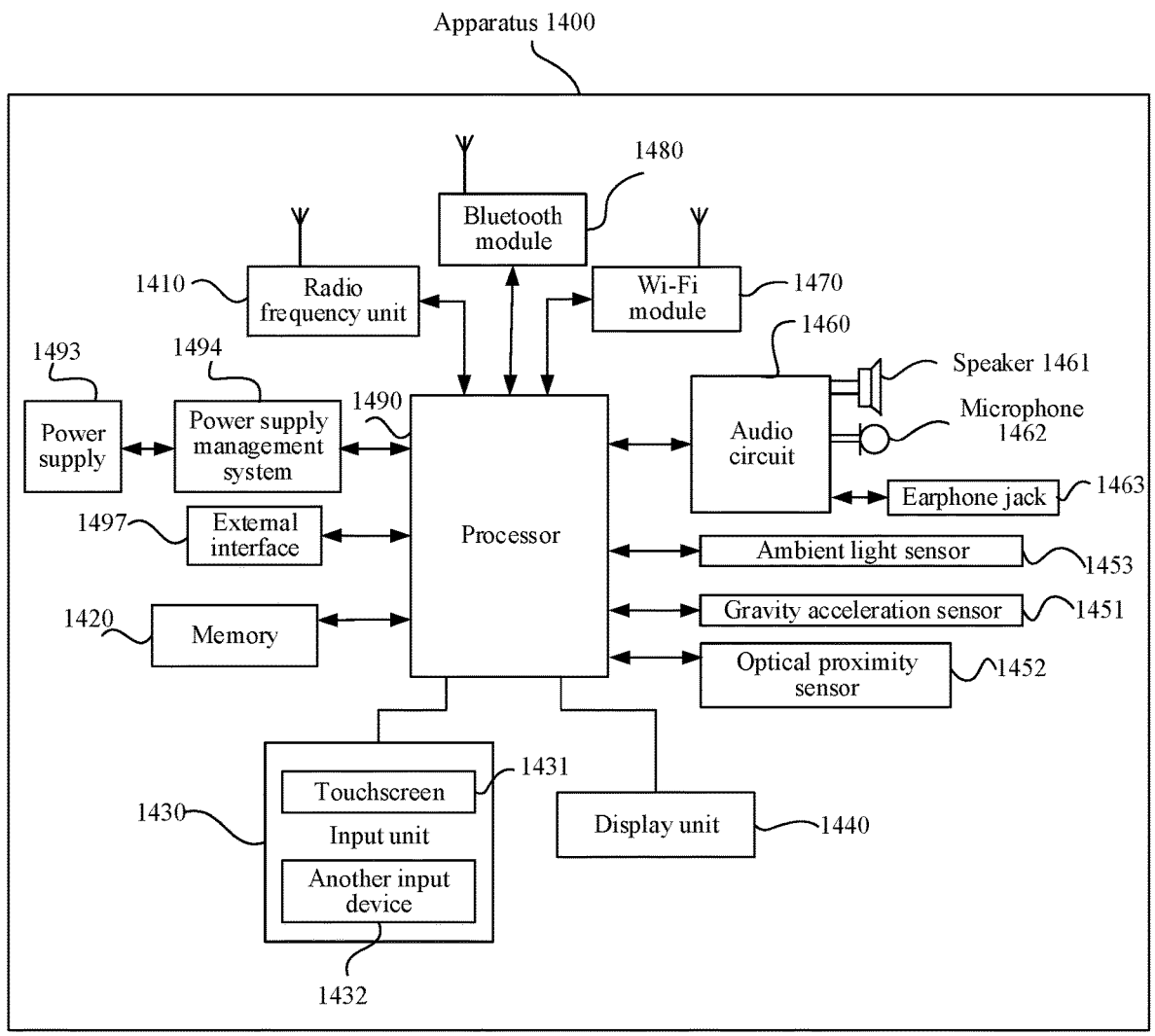
FIG. 14 is a schematic structural diagram of a terminal according to an embodiment of the disclosure.

FIG. 14 is a block diagram of a portable multi-function apparatus 1400 including a touchscreen according to some embodiments. The apparatus 1400 may include an input unit 1430, a display unit 1440, a gravity acceleration sensor 1451, an optical proximity sensor 1452, an ambient light sensor 1453, a memory 1420, a processor 1490, a radio frequency (RF) unit 1410, an audio circuit 1460, a speaker 1461, a microphone 1462, a wireless fidelity (Wi-Fi) module 1470, a Bluetooth module 1480, a power supply 1493, an external interface 1497, and the like.

A person skilled in the art may understand that, FIG. 14 is merely an example of a portable multi-function apparatus and is not intended to limit the portable multi-function apparatus, and the apparatus may include more or fewer components than those shown in the figure, or some components may be combined, or different components are used.

The input unit 1430 may be configured to: receive input digit or character information, and generate a key signal input related to a user setting and function control of the portable multi-function apparatus. Specifically, the input unit 1430 may include a touchscreen 1431 and another input device 1432. The touchscreen 1431 may collect a touch operation of a user on or near the touchscreen 1431 (such as an operation of the user on or near the touchscreen by using any suitable object such as a finger, a joint, or a stylus), and drive a corresponding connection apparatus according to a preset program. The touchscreen may detect a touch operation of the user on the touchscreen, convert the touch operation to a touch signal and send the touch signal to the processor 1490, and can receive and execute a command sent by the processor 1490. The touch signal includes at least touch point coordinate information. The touchscreen 1431 may provide an input interface and an output interface between the apparatus 1400 and the user. In addition, the touchscreen may be implemented in various types such as a resistance type, a capacitance type, an infrared type, and a surface acoustic wave type. In addition to the touchscreen 1431, the input unit 1430 may include the another input device. Specifically, the another input device 1432 may include but is not limited to one or more of a physical keyboard, a function key (such as a volume control key or a power on/off key), a trackball, a mouse, a joystick, and the like.

The display unit 1440 may be configured to display information inputted by the user or information provided for the user, and various menus of the apparatus 1400. Further, the touchscreen 1431 may cover a display panel. After detecting a touch operation on or near the touchscreen 1431, the touchscreen 1431 transfers the touch operation to the processor 1490, to determine a type of the touch event. Then, the processor 1490 provides corresponding visual output on the display panel according to the type of the touch event. In this embodiment, the touchscreen and the display unit may be integrated into one component to implement an input function, an output function, and a display function of the apparatus 1400. For ease of description, in this embodiment of the disclosure, a touchscreen combines functions of the touchscreen and the display unit. In some embodiments, the touchscreen and the display unit may be used as two independent components.

The gravity acceleration sensor 1451 may detect a magnitude of acceleration in various directions (generally three axes), and the gravity acceleration sensor 1451 may further detect a magnitude and a direction of gravity when the terminal is static, to recognize applications of mobile phone gestures (such as horizontal and vertical screen switching, related games, and magnetometer posture calibration), vibration recognition-related functions (such as pedometer and tap), and the like.

The apparatus 1400 may further include one or more optical proximity sensors 1452, configured to close and disable the touchscreen when the apparatus 1400 is relatively close to the user (for example, in a case that the apparatus is close to the ear when the user makes a call) to prevent the user from a misoperation on the touchscreen. The apparatus 1400 may alternatively include one or more ambient light sensors 1453, configured to keep the touchscreen closed when the apparatus 1400 is in the user's pocket or other dark areas, to prevent the apparatus 1400 from consuming unnecessary battery power or being misoperated while in a locked state. In some embodiments, the optical proximity sensor and the ambient light sensor may be integrated in one component, or may be used as two independent components. For other sensors such as a gyroscope, a barometer, a hygrometer, a thermometer, an infrared sensor, and the like that may further be configured on the apparatus 1400, details are not described herein again. Although FIG. 14 shows the optical proximity sensor and the ambient light sensor, it may be understood that the modules are not necessary components of the apparatus 1400, and when required, the modules may be omitted as long as the scope of the essence of the disclosure is not changed.

The memory 1420 may be configured to store instructions and data. The memory 1420 may mainly include an instruction storage area and a data storage area. The data storage area can store an association relationship between a joint touch gesture and an application program function. The instruction storage area may store an operating system, instructions required by at least one function, and the like. The instructions may enable the processor 1490 to perform the speech recognition method in the embodiments of the disclosure.

The processor 1490 is a control center of the apparatus 1400, and is connected to various parts of a mobile phone by using various interfaces and lines. The processor 1490 performs various functions and data processing of the apparatus 1400 by running or executing the instructions stored in the memory 1420 and calling the data stored in the memory 1420, thereby implementing overall monitoring on the mobile phone. Optionally, the processor 1490 may include one or more processing units. In an embodiment, the processor 1490 may integrate an application processor and a modem processor. The application processor mainly processes an operating system, a user interface, an application, and the like. The modem processor mainly processes wireless communication. It may be understood that the modem processor may alternatively not be integrated into the processor 1490. In some embodiments, the processor and the memory may be implemented on a single chip. In some embodiments, the processor and the memory may be implemented on separate chips. In this embodiment of the disclosure, the processor 1490 is further configured to call the instructions stored in the memory to implement the speech recognition method in the embodiments of the disclosure.

The RF unit 1410 may be configured to receive and transmit a signal during an information receiving and sending process or a call process. Particularly, the RF unit 1410 receives downlink information from a base station, then delivers the downlink information to the processor 1490 for processing, and transmits related uplink data to the base station. Generally, the RF circuit includes, but is not limited to, an antenna, at least one amplifier, a transceiver, a coupler, a low noise amplifier (LNA), and a duplexer, and the like. In addition, the RF unit 1410 may further communicate with a network device and another device through wireless communication. The wireless communication may use any communications standard or protocol, which includes, but is not limited to, Global System of Mobile Communication (GSM), General Packet Radio Service (GPRS), Code Division Multiple Access (CDMA), Wideband Code Division Multiple Access (WCDMA), Long Term Evolution, (LTE), email, Short Messaging Service (SMS), and the like.

The audio circuit 1460, the speaker 1461, and the microphone 1462 may provide an audio interface between the user and the apparatus 1400. The audio circuit 1460 may convert received audio data into an electrical signal and transmit the electrical signal to the speaker 1461. The speaker 1461 converts the electrical signal into a sound signal for output. On the other hand, the microphone 1462 is configured to convert an acquired sound signal into an electrical signal. The audio circuit 1460 receives the electrical signal and then converts the electrical signal into audio data, and outputs the audio data to the processor 1490 for processing. Then, the processor 1490 transmits the audio data to, for example, another terminal by using the RF unit 1410, or outputs the audio data to the memory 1420 for further processing. The audio circuit may further include an earphone jack 1463, configured to provide a connection interface between the audio circuit and an earphone.

Wi-Fi belongs to a short distance wireless transmission technology. The apparatus 1400 may help, through the Wi-Fi module 1470, a user to receive and send an email, browse a webpage, and access stream media, and the like, which provides wireless broadband Internet access for the user. Although FIG. 14 shows the Wi-Fi module 1470, it may be understood that the Wi-Fi module is not a necessary component of the apparatus 1400, and when required, the Wi-Fi module may be omitted as long as the scope of the essence of the disclosure is not changed.

Bluetooth is a short distance wireless technology. A Bluetooth technology can effectively simplify communication between mobile communication terminal devices such as a palmtop computer, a notebook computer, and a mobile phone, and can also successfully simplify communication between the devices and the Internet. By using the Bluetooth module 1480, data transmission between the apparatus 1400 and the Internet becomes faster and more efficient, enhancing wireless communication. The Bluetooth technology is an open solution that can implement voice and data wireless transmission. Although FIG. 14 shows the Wi-Fi module 1470, it may be understood that the Wi-Fi module is not a necessary component of the apparatus 1400, and when required, the Wi-Fi module may be omitted as long as the scope of the essence of the disclosure is not changed.

The apparatus 1400 further includes the power supply 1493 (such as a battery) for supplying power to the components. In an embodiment, the power supply may be logically connected to the processor 1490 by using a power management system 1494, thereby implementing functions such as charging, discharging, and power consumption management by using the power management system 1494.

The apparatus 1400 further includes the external interface 1497. The external interface may be a standard Micro USB interface, or may be a multi-pin connector, and may be configured to connect the apparatus 1400 to another apparatus for communication, or may be configured to connect to a charger to charge the apparatus 1400.

Although not shown in the figure, the apparatus 1400 may further include a camera, a flash light, and the like, which are not further described herein.

Based on the foregoing embodiments, this embodiment of the disclosure provides a computer-readable storage medium, storing computer-readable program instructions, and the computer-readable program instructions, when executed by a processor, implementing the speech recognition method and the method for training a speech recognition model in any one of the foregoing method embodiments.

A person skilled in the art would understand that the embodiments of the disclosure may be provided as a method, a system, or a computer program product. Therefore, the disclosure may use a form of hardware only embodiments, software only embodiments, or embodiments with a combination of software and hardware. Moreover, a form of a computer program product that is implemented on one or more volatile or non-volatile computer usable storage media (including but not limited to a disk memory, a CD-ROM, an optical memory and the like) that include computer usable program code may be used in the disclosure.

The disclosure is described with reference to flowcharts and/or block diagrams of the method, the device (system), and the computer program product according to the embodiments of the disclosure. It is to be understood that computer program instructions may be used for implementing each process and/or each block in the flowcharts and/or block diagrams and a combination of a process and/or a block in the flowcharts and/or the block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and operations are performed on the computer or the other programmable devices, thereby generating computer-implemented processing. Therefore, the instructions executed on the computer or another programmable device provide operations used for implementing a specific function in one or more processes in the flowcharts and/or in one or more blocks in the block diagrams.

Although example embodiments of the disclosure have been described, persons skilled in the art would understand that various modifications and changes can be made to these embodiments based on the inventive concept of the disclosure. Therefore, the following claims are intended to be construed as to cover the example embodiments and all changes and modifications falling within the scope of the disclosure.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

According to the example embodiments of the disclosure, an anchor extraction feature of a target speech corresponding to a target word speech is determined according to the target word speech in a hybrid speech, so as to obtain a mask of the target speech according to the anchor extraction feature of the target speech, and recognize the target speech according to the mask. Further, a specific target speech may be recognized and traced according to a target word, and there is no need to learn or estimate the quantity of speakers in the hybrid speech in advance. The target speech is recognized based on an anchor extraction feature of the target speech, thereby improving accuracy and efficiency of speech recognition.

A person skilled in the art may make various modifications and variations to the embodiments of the disclosure without departing from the spirit and scope of the embodiments of the disclosure. The modifications and variations made to the embodiments of the disclosure fall within the scope of the claims of the disclosure and equivalents thereof

What is claimed is:

1. A speech recognition method, performed by at least one processor of an electronic device, the method comprising:
    recognizing a target word speech from a hybrid speech, and obtaining, as an anchor extraction feature of a target speech, an anchor extraction feature of the target word speech based on the target word speech;
    obtaining a mask of the target speech according to the anchor extraction feature of the target speech; and
    recognizing the target speech according to the mask of the target speech,
    wherein the obtaining the anchor extraction feature of the target word speech comprises:
    determining, by the at least one processor, an embedding vector corresponding to each time-frequency window of the hybrid speech; and
    obtaining, by the at least one processor, the anchor extraction feature of the target word speech according to determined embedding vectors and a preset anchor extraction feature.

2. The method according to claim 1, wherein the obtaining the anchor extraction feature of the target word speech further comprises:
    determining, according to determined embedding vectors and the preset anchor extraction feature, target word annotation information corresponding to the embedding vectors; and
    obtaining the anchor extraction feature of the target word speech according to the embedding vectors, the preset anchor extraction feature, and the corresponding target word annotation information.

3. The method according to claim 1, wherein the obtaining the mask comprises:
obtaining normalized embedding vectors corresponding to the embedding vectors according to the embedding vectors and the anchor extraction feature of the target speech; and
obtaining the mask of the target speech according to the normalized embedding vectors and a preset normalized anchor extraction feature.

4. The method according to claim 1, wherein the determining the embedding vector comprises:
performing a short-time Fourier transform (STFT) on the hybrid speech, to obtain a frequency spectrum of the hybrid speech; and
mapping the frequency spectrum of the hybrid speech into an original embedding space of a fixed dimension, to obtain the embedding vector corresponding to each time-frequency window of the hybrid speech.

5. The method according to claim 2, wherein the determining the target word annotation information comprises:
separately combining the embedding vectors with the preset anchor extraction feature; and
obtaining the target word annotation information corresponding to the embedding vectors by inputting combined embedding vectors into a pre-trained first forward network, wherein a value of target word annotation information corresponding to an embedding vector not comprising the target word speech is 0, and a value of target word annotation information corresponding to an embedding vector comprising the target word speech is 1.

6. The method according to claim 3, wherein the obtaining the normalized embedding vectors comprises:
separately combining the embedding vectors with the anchor extraction feature of the target speech, to obtain combined 2K-dimensional vectors, wherein the embedding vectors and the anchor extraction feature of the target speech are K-dimensional vectors, respectively;
inputting the combined 2K-dimensional vectors into a pre-trained second forward network; and
mapping the combined 2K-dimensional vectors into a normalized embedding space of a fixed dimension based on the second forward network, to obtain, as the normalized embedding vectors of the corresponding embedding vectors, corresponding K-dimensional vectors outputted by the second forward network.

7. The method according to claim 3, wherein the obtaining the mask of the target speech comprises:
obtaining distances between the normalized embedding vectors and the preset normalized anchor extraction feature, and obtaining the mask of the target speech according to the distances.

8. The method according to claim 1, further comprising:
inputting the recognized target speech into a pre-trained target word determining module, which is implemented in computer code executable by the at least one processor, to determine whether the target speech comprises the target word speech;
adjusting the anchor extraction feature of the target speech to reduce a weight of a preset anchor extraction feature in response to determining that the target speech comprises the target word speech, or adjusting the anchor extraction feature of the target speech to increase the weight of the preset anchor extraction feature in response to determining that the target speech does not comprise the target word speech, wherein the anchor extraction feature of the target speech is obtained by using the preset anchor extraction feature; and
recognizing the target speech according to the adjusted anchor extraction feature of the target speech.

9. A method for training a speech recognition model, performed by at least one processor of an electronic device, the speech recognition model comprising a target speech extraction module and a target word determining module, each being implemented in computer code executable by the at least one processor, the method comprising:
obtaining a speech sample set, the speech sample set being any one or any combination of: a clean target word speech sample set, a positive and negative sample set of a noisy target word speech, and a noisy command speech sample set;
training the target speech extraction module by using the speech sample set as an input of the target speech extraction module and by using a recognized target speech as an output of the target speech extraction module, a target function of the target speech extraction module being to minimize a loss function between the recognized target speech and a clean target speech; and
training the target word determining module by using, as an input of the target word determining module, a target speech outputted by the target speech extraction module, and by using, as an output of the target word determining module, a target word determining probability, a target function of the a target word determining module being to minimize a cross entropy (CE) loss function of a target word determining result,
wherein the obtaining the speech sample comprises obtaining an embedding vector corresponding to each time-frequency window of any one or any combination of: the clean target word speech sample set, the positive and negative sample set of the noisy target word speech, and the noisy command n speech sample set, and obtaining an anchor extraction feature according to obtained embedding vectors and a preset anchor extraction feature, and
wherein, in the target speech extraction module, the target speech is recognized based on the anchor extraction feature.

10. A speech recognition apparatus, comprising:
at least one memory configured to store program code; and
at least one processor configured to read the program code and operate as instructed by the program code, the program code comprising:
first obtaining code configured to cause at least one of the at least one processor to recognize a target word speech from a hybrid speech, and obtain, as an anchor extraction feature of a target speech, an anchor extraction feature of the target word speech based on the target word speech;
second obtaining code configured to cause at least one of the at least one processor to obtain a mask of the target speech according to the anchor extraction feature of the target speech; and
recognition code configured to cause at least one of the at least one processor to recognize the target speech according to the mask of the target speech,
wherein the first obtaining code is configured to cause at least one of the at least one processor to determine an embedding vector corresponding to each time-frequency window of the hybrid speech; and obtain the anchor extraction feature of the target word speech according to determined embedding vectors and a preset anchor extraction feature.

11. The apparatus according to claim 10, wherein the first obtaining code is configured to cause at least one of the at least one processor to:
determine, according to determined embedding vectors and the preset anchor extraction feature, target word annotation information corresponding to the embedding vectors; and
obtain the anchor extraction feature of the target word speech according to the embedding vectors, the preset anchor extraction feature, and the corresponding target word annotation information.

12. The apparatus according to claim 10, wherein the second obtaining code is configured to cause at least one of the at least one processor to:
obtain normalized embedding vectors corresponding to the embedding vectors according to the embedding vectors and the anchor extraction feature of the target speech; and
obtain the mask of the target speech according to the normalized embedding vectors and a preset normalized anchor extraction feature.

13. The apparatus according to claim 12, wherein the second obtaining code is configured to cause at least one of the at least one processor to:
separately combine the embedding vectors with the anchor extraction feature of the target speech, to obtain combined 2K-dimensional vectors, wherein the embedding vectors and the anchor extraction feature of the target speech are K-dimensional vectors, respectively;
input the combined 2K-dimensional vectors into a pre-trained second forward network; and
map the combined 2K-dimensional vectors into a normalized embedding space of a fixed dimension based on the second forward network, to obtain, as the normalized embedding vectors of the corresponding embedding vectors, corresponding K-dimensional vectors outputted by the second forward network.

14. The apparatus according to claim 12, wherein the second obtaining code is configured to cause at least one of the at least one processor to:
obtain distances between the normalized embedding vectors and the preset normalized anchor extraction feature, and obtain the mask of the target speech according to the distances.

15. The apparatus according to claim 10, wherein the program code further comprises:
adjustment code configured to cause at least one of the at least one processor to input the recognized target speech into a pre-trained target word determining module, which is implemented in computer code executable by at least one of the at least one processor, to determine whether the target speech comprises the target word speech; and adjust the anchor extraction feature of the target speech to reduce a weight of a preset anchor extraction feature in response to determining that the target speech comprises the target word speech, or adjust the anchor extraction feature of the target speech to increase the weight of the preset anchor extraction feature in response to determining that the target speech does not comprise the target word speech,
wherein the anchor extraction feature of the target speech is obtained by using the preset anchor extraction feature, and
wherein the target speech is recognized according to the adjusted anchor extraction feature of the target speech.

16. An apparatus for training a speech recognition model, the apparatus comprising:
at least one memory configured to store program code; and
at least one processor configured to read the program code and operate as instructed by the program code to perform the method for training the speech recognition model according to claim 9, the speech recognition model comprising a target speech extraction module and a target word determining module, each being implemented in computer code executable by the at least one processor,
the program code comprising:
obtaining code configured to cause at least one of the at least one processor to obtain a speech sample set, the speech sample set being any one or any combination: a clean target word speech sample set, a positive and negative sample set of a noisy target word speech, and a noisy command speech sample set; and
training code configured to cause at least one of the at least one processor to train the target speech extraction module by using the speech sample set as an input of the target speech extraction module and by using a recognized target speech as an output of the target speech extraction module, a target function of the target speech extraction module being to minimize a loss function between the recognized target speech and a clean target speech; and train the target word determining module by using, as an input of the target word determining module, a target speech outputted by the target speech extraction module, and by using, as an output of the target word determining module, a target word determining probability, a target function of the target word determining module being to minimize a cross entropy (CE) loss function of a target word determining result.

17. An electronic device, comprising:
at least one memory, configured to store computer-readable program instructions; and
at least one processor, configured to call the computer-readable program instructions stored in the at least one memory to perform the speech recognition method according to claim 1.

18. A non-transitory computer-readable storage medium, storing computer-readable program instructions, the computer-readable program instructions being loaded by a processor to perform the method according to claim 1.

19. An electronic device, comprising:
at least one memory, configured to store computer-readable program instructions; and
at least one processor, configured to call the computer-readable program instructions stored in the at least one memory to perform the method according to claim 9.

20. A non-transitory computer-readable storage medium, storing computer-readable program instructions, the computer-readable program instructions being loaded by a processor to perform the method according to claim 9.

* * * * *